US011587445B2

(12) United States Patent
Sakamaki et al.

(10) Patent No.: US 11,587,445 B2
(45) Date of Patent: Feb. 21, 2023

(54) SYSTEM AND METHOD FOR FUSING ASYNCHRONOUS SENSOR TRACKS IN A TRACK FUSION APPLICATION

(71) Applicant: Fortem Technologies, Inc., Pleasant Grove, UT (US)

(72) Inventors: Joshua Yohane Sakamaki, Provo, UT (US); Matthew Elliott Argyle, Lindon, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 0 days.

(21) Appl. No.: 17/699,750

(22) Filed: Mar. 21, 2022

(65) Prior Publication Data

US 2022/0215762 A1      Jul. 7, 2022

Related U.S. Application Data

(63) Continuation of application No. 16/368,432, filed on Mar. 28, 2019, now Pat. No. 11,282,397.

(51) Int. Cl.
*G01S 7/41* (2006.01)
*G08G 5/00* (2006.01)
*G01S 13/86* (2006.01)
*G01S 13/72* (2006.01)

(52) U.S. Cl.
CPC .............. *G08G 5/0008* (2013.01); *G01S 7/41* (2013.01); *G01S 13/72* (2013.01); *G01S 13/86* (2013.01)

(58) Field of Classification Search
CPC ......... G08G 5/0008; G01S 7/41; G01S 13/72; G01S 13/86
See application file for complete search history.

(56) References Cited

U.S. PATENT DOCUMENTS

| 4,814,758 | A  | 3/1989  | Chang |
| 5,949,367 | A  | 9/1999  | Trompf et al. |
| 6,653,971 | B1 | 11/2003 | Guice et al. |
| 8,831,906 | B1 | 9/2014  | Alon et al. |
| 9,997,079 | B2 | 6/2018  | Paczan et al. |
| 10,051,475 | B2 | 8/2018 | Shattil et al. |
| 2017/0092138 | A1 | 3/2017 | Trundle et al. |
| 2017/0129603 | A1 | 5/2017 | Raptopoulos |
| 2018/0158197 | A1 | 6/2018 | Martirosyan et al. |
| 2019/0049968 | A1 | 2/2019 | Dean et al. |

FOREIGN PATENT DOCUMENTS

GB         2562829 A     11/2018

*Primary Examiner* — Mathew Franklin Gordon

(57) ABSTRACT

An example method can include receiving, at a sensor, a signal associated with a motion of a target, processing the signal via a first filter having a first motion model and a second filter having a second motion model to yield a first tracking output and a second tracking output for the target, and weighting the first tracking output and second tracking output according to how well each of the first motion model and second motion model represents the motion of the target, to yield a first weight for the first tracking output and a second weight for the second tracking output. The method can include combining the first tracking output and second tracking output to yield a fused tracking output and sending, to a fusion system, the fused tracking output, the first weight associated with the first tracking output and the second weight associated with the second tracking output.

20 Claims, 12 Drawing Sheets

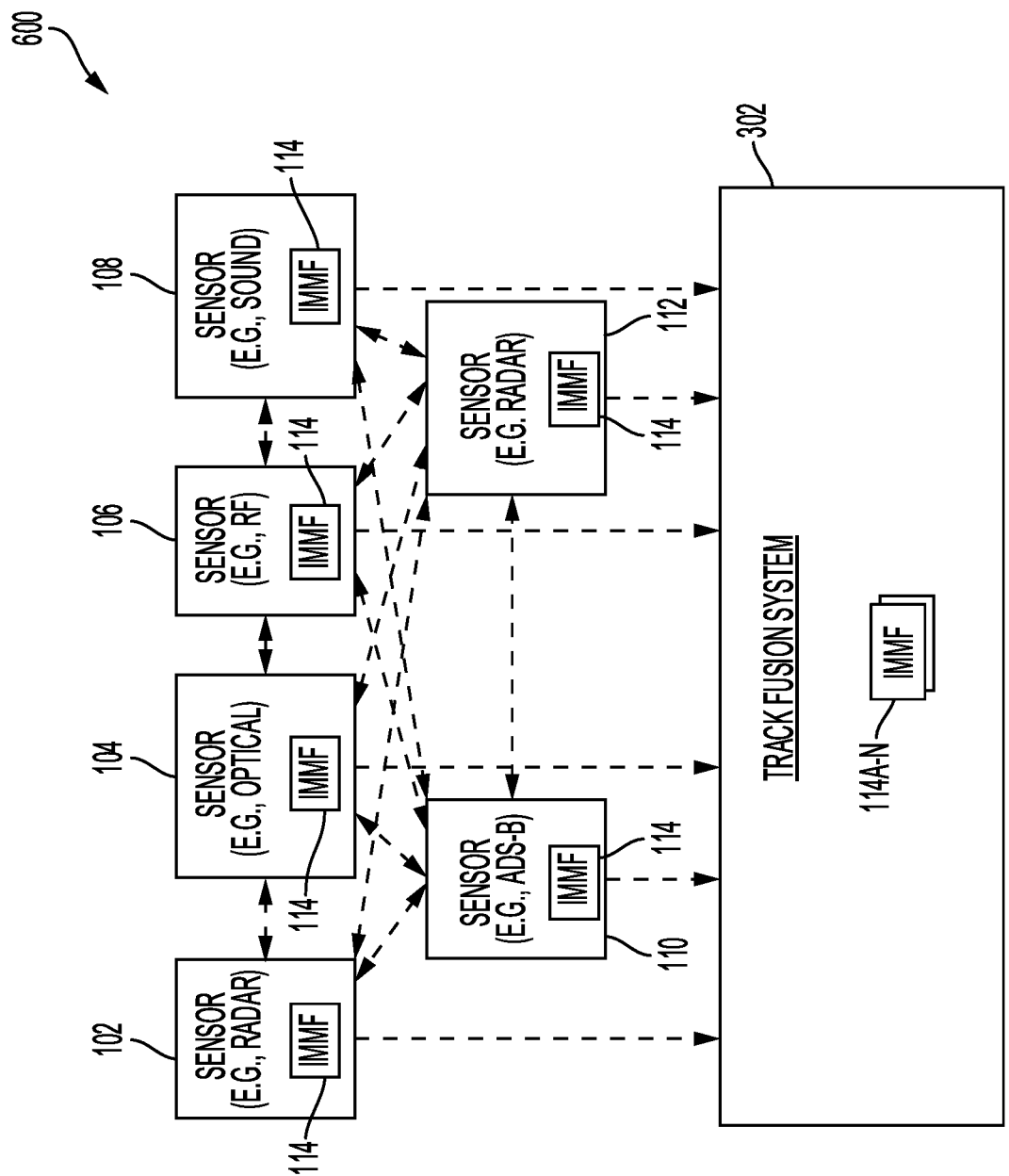

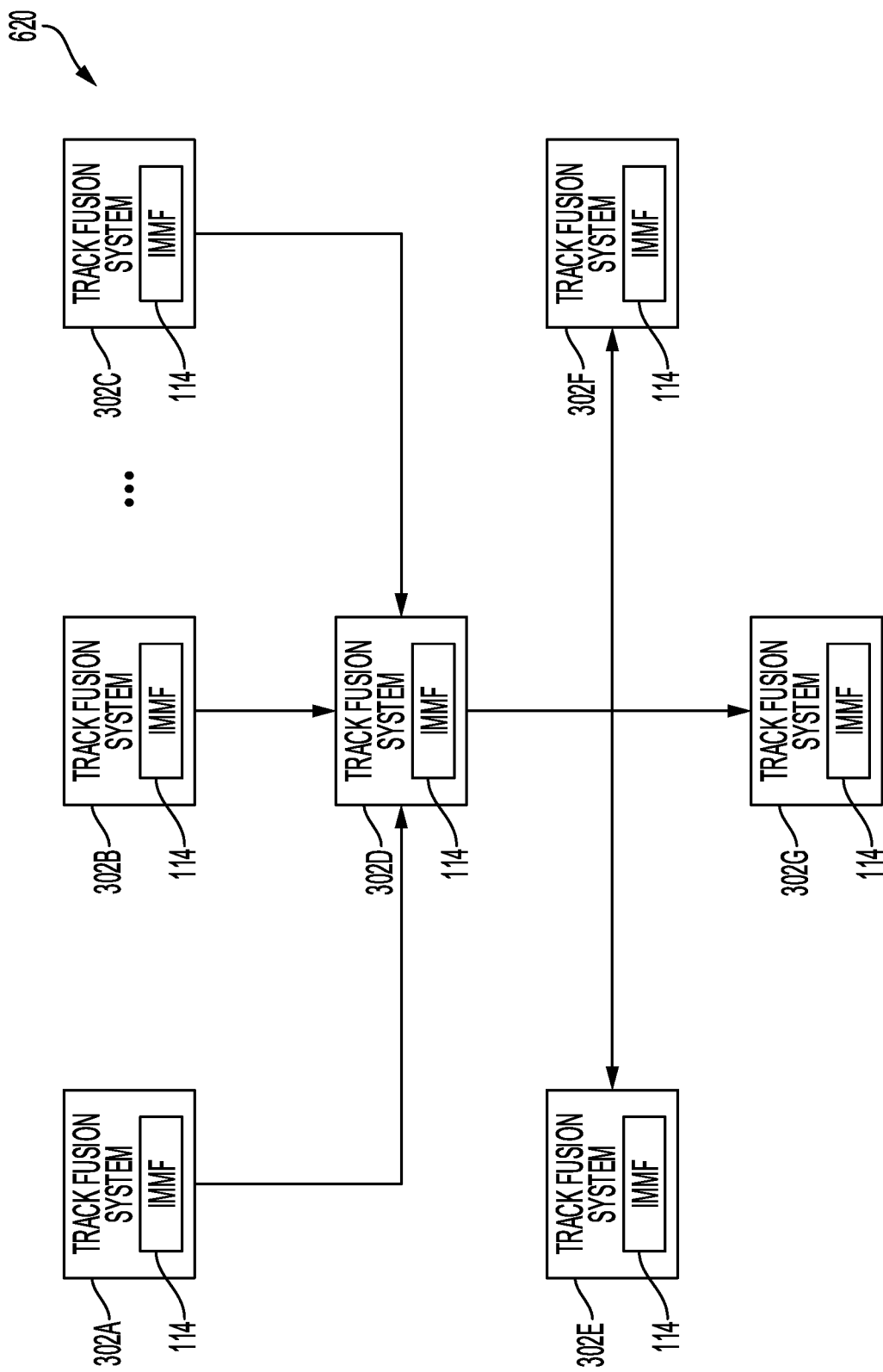

SYSTEM AND METHOD FOR FUSING ASYNCHRONOUS SENSOR TRACKS IN A TRACK FUSION APPLICATION

CROSS-REFERENCE TO RELATED APPLICATIONS

The present application is a continuation of U.S. patent application Ser. No. 16/368,432, filed Mar. 28, 2019, which is related to U.S. Provisional Patent Application No. 62/739,973 filed on Oct. 2, 2018, entitled "SYSTEM AND METHOD FOR DRONE AND OBJECT CLASSIFICATION", the contents of which are hereby expressly incorporated by reference in their entirety.

TECHNICAL FIELD

The present disclosure relates to tracking objects in airspace, and more specifically to fusing asynchronous sensor tracks to track objects in airspace.

BACKGROUND

The widespread adoption of aircrafts, drones and other airborne vehicles has created congested airspaces, increasing the risks of airspace collisions and the difficulty of managing airspace traffic. The emergence and increasing popularity of drone technologies and unmanned aerial vehicles (UAVs) have increased the number and type of obstacles in airspaces, thus further complicating airspace management and increasing the risk of collisions. Moreover, the growing availability and use of UAVs, such as drones, for civilian and other applications has further exacerbated these problems and created new flight risks and challenges.

Tracking applications can be used to track and monitor objects in airspace, such as UAVs and other airborne vehicles, in order to manage airspaces and avoid airspace collisions. Unfortunately, current tracking applications are greatly limited in their ability to accurately and effectively track objects in airspace. For example, current tracking applications generally fail to correctly describe the motion of targets or adequately capture the complete dynamics of a target object. Consequently, as a target object maneuvers, accelerates/decelerates, or changes trajectory, the tracking or predictive results of current tracking applications become increasingly less effective and accurate. The limited accuracy and effectiveness of current tracking applications have thus hindered efforts to track objects and avoid airspace collisions, which create many problems and pose significant threats for governments, citizens, and communities.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only example implementations of the disclosure and are not therefore to be considered to be limiting of its scope, the principles herein will be described and explained with additional specificity and detail through the use of the accompanying drawings in which:

FIGS. 6A and 6B illustrate example configurations for distributed tracking;

DETAILED DESCRIPTION

Figure 1A:
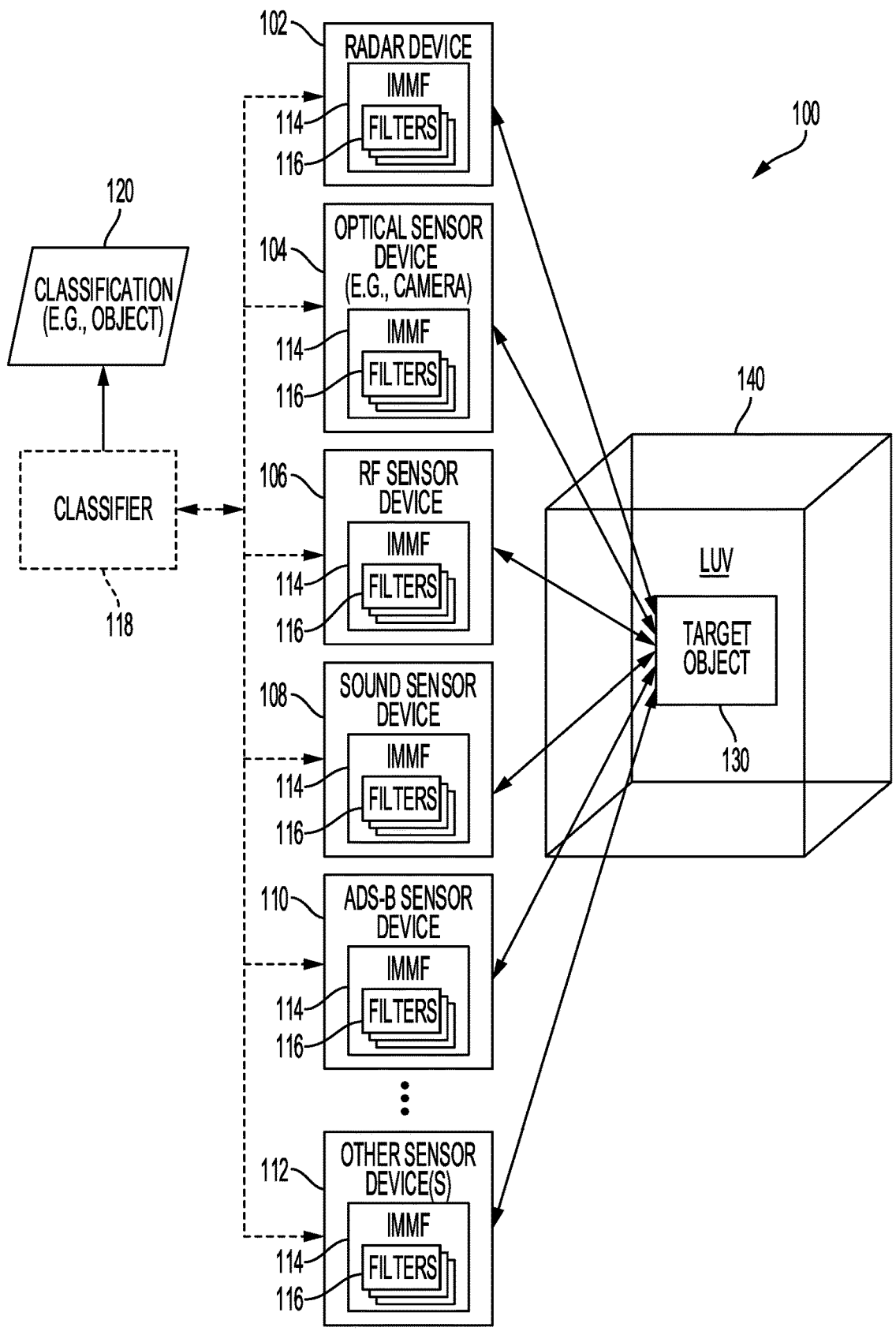
FIGS. 1A and 1B illustrate example multi-sensor environments for tracking objects in airspace.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can refer to the same embodiment or any disclosed embodiment. For example, reference to "one embodiment", "an embodiment" or "some embodiments" means that any features, concepts, structures, and/or characteristics described in connection with such embodiment(s) are included in at least such embodiment(s) of the disclosure, but are not limited to such embodiment(s) and can indeed be included in any other embodiment(s) of the disclosure. The appearances of the phrases "in one embodiment", "in an embodiment" or "in some embodiments" in various places in the disclosure are not necessarily all referring to the same embodiment(s), nor are separate or alternative embodiments mutually exclusive of other embodiments.

The terms used in this specification generally have their ordinary meanings in the art, within the context of the disclosure, and in the specific context where each term is used. Unless otherwise defined, technical and scientific terms used herein have the meaning as commonly understood by one of ordinary skill in the art to which this disclosure pertains. In the case of conflict, the present document, including definitions and description will control.

Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Note that titles or subtitles may be used in the examples for convenience of a reader, which in no way should limit the scope of the disclosure.

Without intent to limit the scope of the disclosure, examples of instruments, apparatus, methods and their related results according to embodiments of the present disclosure are given below. However, the disclosure is not limited to the examples or embodiments described in this specification. Additional features and advantages of the disclosure will be set forth in the description which follows, and in part will be obvious from the description, or can be learned by practice of the principles disclosed herein. The features and advantages of the disclosure can be realized and obtained by means of the instruments, elements and techniques particularly pointed out in the appended claims. These and other features of the disclosure will become more fully apparent from the following description and appended claims, and/or can be learned by the practice of the principles set forth herein.

Overview

The present disclosure relates to tracking objects in airspace or any other environment. As previously mentioned, tracking objects in airspace can help manage airspaces and avoid airspace collisions. For example, a drone can track another drone through the air and seek to identify the target drone to determine whether it is a bad actor and avoid an airspace collision with the target drone. In target tracking applications, sensors can be used to observe the motion of a target object. Since sensors generally contain errors (which are usually random in nature), the observations or measurements from sensors can be processed through a filter that estimates the target object's states (e.g., position, velocity, trajectory, etc.) and error covariance.

In some aspects, a Kalman filter (or any variant thereof) can be used to process sensor measurements and estimate a target object's states and error covariance. The Kalman filtering process, also known as linear quadratic estimation (LQE), uses an algorithm that applies a series of measurements observed over time, which contain statistical noise and other inaccuracies. The filter produces estimates of unknown variables that tend to be more accurate than those generated from a single measurement, by estimating a joint probability distribution over the variables for each timeframe.

The Kalman filter can have two parts: a prediction step and a measurement update step. The prediction step relies on an assumed model for the target dynamics to propagate or predict the target object's states at some point in the future. Once the target object's states have been propagated, a measurement can be applied to further increase the accuracy of the estimation. One of the challenges in using a tracking filter, such as a Kalman filter, is creating a model that accurately describes the motion of the target objects. In most tracking applications, the use of a single model is insufficient to capture the complete dynamics of a target object. For example, a target object moving in a straight line with a constant speed can be tracked with a constant or nearly-constant velocity model. However, if the target begins to maneuver, turn or accelerate, the constant or nearly-constant velocity model becomes significantly less effective when used in tracking or predicting the movement of the target object.

The problems outlined above highlight the need to properly identify and track objects in airspace, particularly if an object such as a drone is exhibiting hostile behavior or evading detection. The present technologies address the foregoing problems and need in the art for improved tracking applications. Disclosed herein are systems, methods, and computer-readable media for calculating and fusing asynchronous sensor tracks in a track fusion application. In some aspects, an example method can include receiving a first signal at a first sensor and a second signal at a second sensor. The first and second signal can include measurements and/or sensed data representing a motion (e.g., velocity, acceleration, trajectory, altitude, etc.) of a target object and/or a position (e.g., airspace location, angle, etc.) of the target object. For example, the first and second signal can include radar returns, image data capturing one or more aspects (e.g., location, angle, direction, size, shape, relative distance, etc.) of the target object, sound measurements capturing a sound associated with the target object and/or its environment, ADS-B data, rangefinder measurements, etc.

In some cases, the first signal and the second signal can include respective sensor data measuring one or more aspects of the motion of the target object and/or a position of the target object at one or more times. The one or more aspects of the motion and/or position of the target object can include, for example, a velocity of the target object, an acceleration of the target object, an angle of the target object, a location of the target object in three-dimensional space, a trajectory of the target object, etc.

Moreover, in some cases, the first sensor and the second sensor can be different types of sensors. For example, the first sensor can be a radar sensor and the second sensor can be an optical sensor, or vice versa. In other cases, the first and second sensors may be the same type of sensor, such as a radar sensor, an optical sensor (e.g., a camera), a sound sensor (e.g., a microphone), an RF sensor, an ADS-B sensor, a rangefinder, etc.

The method can further include processing the first signal via a first filter having a first motion model and a second filter having a second motion model, to yield a first tracking output calculated for the target object using the first filter and a second tracking output calculated for the target object using the second filter. In some cases, the first filter and the second filter can be part of an interactive multiple model filter (IMMF), which is a model, structure, and/or algorithm containing, managing, and/or implementing a plurality of filters. The IMMF can implement any number of filters, including two or more different (and/or the same/similar) filters. In some cases, some or all of the filters in the IMMF can implement different (or the same) motion models and/or parameters. Moreover, in some cases, the first motion model and the second motion model can be associated with different target dynamics. For example, the first motion model can be a constant or near-constant velocity model and the second motion model can be a constant or near-constant acceleration model.

The method can also include processing the second signal via a third filter having a third motion model and a fourth filter having a fourth motion model, to yield a third tracking output calculated for the target object using the third filter and a fourth tracking output calculated for the target object using the fourth filter. The first, second, third, and/or fourth filters can include one or more respective tracking algorithms, such as a Kalman filter, which can be modified to deploy higher-ordered models, such as constant or nearly-constant acceleration or velocity models.

Moreover, in some cases, the third motion model and the fourth motion model can be associated with different target dynamics. For example, the third motion model can be a constant or near-constant velocity model and the second motion model can be a constant or near-constant acceleration model. As another example, the third motion model can be a dynamic motion model and the second motion model can be a random velocity or acceleration model.

In some cases, the first, second, third and/or fourth filters can be part of one or more IMMFs, and each IMMF can contain a plurality of filters. For example, in some aspects, an IMMF can be implemented to include multiple filters, such as multiple Kalman filters, which can be run or executed in parallel. Each filter in an IMMF can track a target object using a different target or motion model, and generate a respective state estimate and error covariance for the target object. The IMMF can monitor the performance of the filters and assign a weight to each based on how well their respective model represents the target object's motion at a given time. The model weights can be used to propagate the output of the various filters and/or sensors to a common time step and/or combine filter and/or sensor outputs in order to generate a single state estimate and error covariance, as further described below, which can be referred to as a track. For example, the system can initialize a first filter and the second filter (or any group of filters) using fused tracking output and using the set of weights to perform a propagation to a future time such as a common time step.

The IMMF allows tracking of target objects over a wide range of dynamics. Moreover, multiple sensors can be used as described herein to obtain additional information about a target object, survey larger geographical areas, and increase the accuracy of state estimates. In a multi-sensor application, tracks produced by each sensor (which can be of a different type such as a radar as one sensor and a camera (or optical sensor) as another) can be communicated to a remote device, such as a remote sensor device or a remote tracking system, for further processing. In some aspects, the tracks can be communicated to a centralized tracking or control system, and/or directly communicated between sensors and/or devices as in a distributed network.

The method can further include weighting the first tracking output calculated for the target object, the second tracking output calculated for the target object, the third tracking output calculated for the target object, and the fourth tracking output calculated for the target object according to how well each of the first motion model (and/or the first tracking output), the second motion model (and/or the second tracking output) represents the motion of the target object, to yield a first weight associated with the first tracking output and a second weight associated with the second tracking output. The method can also include weighting the third tracking output calculated for the target object and the fourth tracking output calculated for the target object according to how well each of the third motion model (and/or the third tracking output) and the fourth motion model (and/or the fourth tracking output) represents the motion of the target object, to yield a third weight associated with the third tracking output and a fourth weight associated with the fourth tracking output.

In some cases, weighting the first tracking output and the second tracking output can include calculating a first set of weights for the first tracking output and the second tracking output based on a likelihood of accuracy associated with the first tracking output and the second tracking output. Likewise, weighing the third tracking output and the fourth tracking output can include calculating a second set of weights for the third tracking output and the fourth tracking output based on a likelihood of accuracy associated with the third tracking output and the fourth tracking output. In some examples, each respective weight from the first set of weights and the second set of weights has a respective value between 0 and 1. Moreover, the sum of all weights in the first set of weights can equal 1, and the sum of all weights in the second set of weights can also equal 1.

The method can further include combining the first tracking output and the second tracking output to yield a first fused tracking output, and combining the third tracking output and the fourth tracking output to yield a second fused tracking output.

In some cases, the method can include providing the first fused tracking output and the first set of weights associated with the first and second tracking outputs, as well as the second fused tracking output and the second set of weights associated with the third and fourth tracking output to a track fusion system for track fusion. In some examples, the method can include time aligning the first fused tracking output and the second fused tracking output.

For example, the first and second fused tracking outputs can be projected to a common time step, such as time step t+i, where i represents a value equal to or greater than one. Time aligning the first and second fused tracking outputs can help determine with greater accuracy if the first and second fused tracking outputs represent or correspond to a same target object, as tracks that are misaligned in time can be harder to compare or identify as representing the same target object and may lead to errors or inaccuracies when comparing the tracks to determine whether the tracks represent a same target object.

The method can also include comparing the first time aligned fused tracking output with the second time aligned fused tracking output to determine whether the first time aligned fused tracking output and the second time aligned fused tracking output represent a same target object. To illustrate, if the first fused tracking output represents target object 1 and the second fused tracking output also represents target object 1 the first time aligned fused tracking output and the second time aligned fused tracking output can be compared to indicate that they represent the same target object. Moreover, if the first fused track output represents target object 1 and the second fused tracking output represents target object 2, the first time aligned fused tracking output and the second time aligned fused tracking out can be compared to indicate that they represent different target objects.

The method can also include, when the comparison indicates that the first fused tracking output and the second fused tracking output represent the same target object, combining the first fused tracking output with the second fused tracking output to yield a single fused track associated with the target object. The single fused track can represent a motion of the target object, a location of the target object, a trajectory or path of the target object, etc. The single fused track can thus be used to track the target object. In some cases, the single fused track can be used with other fused tracks calculated for the target object to track the target object and/or can be communicated to one or more devices, which can store the single fused track and/or use the single fused track in tracking the target object.

In some cases, the combining can involve performing track fusion of the tracks to generate a single fused track. For example, in the previous example where the first fused tracking output represents target object 1 and the second fused tracking output also represents target object 1, the first and second fused tracking outputs can be associated to indicate they represent the same target object, and fused into a single fused track (e.g., fused track 1).

In some examples, the first tracking output, the second tracking output, the third tracking output, the fourth tracking output, the first fused tracking output, the second fused tracking output, and/or the single fused track can include respective state and error covariance variables calculated for the target object based on the first, second, third, and/or fourth filters. The respective state and error covariance variables can include, for example, respective velocity variables (e.g., velocity up, velocity down, velocity east, velocity west, etc.), respective position variables (e.g., position up, position down, position east, position west, etc.), respective motion variables, respective angle variables, and/or any other location and motion parameters.

In some aspects, the method can include dynamically adjusting one or more weights defined for weighting the first tracking output, the second tracking output, the third tracking output, the fourth tracking output, the first fused tracking output, and/or the second fused tracking output based on how accurately they respectively reflect the motion and/or position of the target object. For example, if a specific tracking output is determined to poorly reflect the motion of the target object, the weight associated with that tracking output can be decreased thus changing the bias or calculated accuracy of that tracking output. Similarly, if a specific tracking output is determined to accurately reflect the motion of the target object, the weight associated with that tracking output can be increased to change the bias or calculated accuracy of that tracking output.

Example Embodiments

The present technology will be described in the following disclosure as follows. The discussion begins with a description of various approaches for tracking objects and fusing asynchronous sensor tracks in a track fusion application. A more detailed discussion of example systems, methods, and techniques for tracking objects and calculating and fusing asynchronous sensor tracks in a track fusion application, as shown in FIGS. 1A through 8, will then follow. The discussion concludes with a description of an example computing device architecture, as illustrated in FIG. 9, including example hardware components that can be implemented a computing device to perform various tracking and other computing operations as described herein.

The disclosure now turns to a description of various approaches for tracking objects and fusing asynchronous sensor tracks in a track fusion application. The use of multiple sensors is often desirable as it allows a system to survey larger geographical areas and can help increase the accuracy of target state estimates. In a multi-sensor application, tracks produced by each sensor can be communicated to one or more devices, such as a tracking system or distributed trackers, for further processing. For illustration and explanation purposes, the following examples and discussion will assume that tracks are communicated to a centralized tracking system. However, in other examples, the tracks can be communicated to other devices in addition to, or in lieu of, the centralized tracking system. For example, in some cases, the tracks can be directly communicated between sensors in a distributed manner.

Once the tracks from multiple sensors are communicated to the centralized tracking system, the centralized tracking system can perform track-to-track association (T2TA) and track-to-track fusion (T2TF). In T2TA, one or more tracks from one sensor are compared to one or more tracks from another sensor to determine which, if any, are associated (e.g., which tracks represent the same target object). Once the T2TA is complete, any associated tracks can be used to perform T2TF, where state estimates and error covariances from the associated tracks are fused, producing a single, more accurate result.

In general, the time at which a track is produced is assumed to be known (e.g., through the use of GPS time or any other time system). However, one of the difficulties in T2TA and T2TF is that most sensors are asynchronous with respect to each other, and consequently produce measurements or estimates at different times or with different timestamps. Moreover, the processing and communication of information such as tracks to a remote system, such as the centralized tracking system, introduces latency which further misaligns the tracks from different sensors. Performing T2TA or T2TF on tracks that are misaligned in time can degrade the results and system performance.

To avoid such time-related problems, the tracks from different sensors can be time aligned. In some examples, the tracks sent to the centralized tracking system (or any other device) can be time aligned by propagating them to a common time step using an IMMF propagation step. To ensure exact propagation for an IMMF, the same filter(s) used by the local processors associated with the sensors can be deployed on the centralized tracking system. State estimates and error covariances of the underlying filter models can be transmitted from the local processors to the centralized tracking system. Such transmission can place a burden on the communication link, causing unwanted latency. For example, consider a tracking scenario in which the 3D position and velocity components of a target object are being tracked. In this case, each model can be represented by 6 variables for the state estimate and 36 variables for the error covariance (which is a square matrix). If, for example, 3 models are implemented for the IMMF in use, then this would equate to 126 variables being sent for each track.

To reduce the amount of data that needs to be communicated to the centralized tracking system (or between other devices), and consequently the communication latency and/or burden on the communication link, the approaches herein can make various simplifying assumptions and take advantage of a structure of the model parameters. For example, in some cases, instead of communicating the estimated state and error covariance for each model of each track, only the fused output of each track, which again is represented by a single state estimate and single covariance, and the modeled weights may be communicated to the centralized tracking system.

The centralized tracking system can then initialize every IMMF model using the communicated parameters (e.g., the fused output of each track) and perform the filter propagation steps. Once propagated, the state estimate and error covariances of the different models can be fused together using the model weights. This can greatly reduce amount of data communicated for each track to a single state estimate, a single error covariance, and the model weights for each IMMF model. Further reductions in the amount of transmitted data can be achieved by taking advantage of the fact that the error covariance is a symmetric matrix and can be fully represented by the upper or lower triangle. Moreover, since the model weights for a given fused tracking output sum to 1, the amount of weights communicated can be reduced to a subset of n-1 model weights, where n is the number of models used. Thus, in comparison to the 126 variables in the example above, in this example only 6 state estimate variables, 21 error covariance variables, and 2 model weights may be communicated for each track, for a total of 29 variables.

The disclosure now turns to FIG. 1A, which illustrates an example multi-sensor environment 100 for tracking objects in airspace. The multi-sensor environment 100 includes multiple sensor devices 102-112 configured to calculate or collect sensor measurements or data (e.g., radar returns, captured images, captured audio, radio frequency signals, location parameters, velocity measurements, altitude measurements, etc.) to detect and/or track a target object 130 in airspace. The target object 130 can be any object in airspace, such as a building, mountain, or structure, and/or any object or vehicle with flight capabilities (e.g., powered flight, gliding, etc.), such as, without limitation, a helicopter, an unmanned aerial vehicle (UAV), a jet or airplane, a hang glider, a hot air balloon, a bird, etc. For example, in some cases, the target object 130 can be a rotor-based UAV that includes one or more rotors for lifting, maneuvering, moving, changing orientation (e.g., pitch, roll, and/or yaw), landing, etc.

In some examples, the sensor devices 102-112 can be used to calculate or collect sensor measurements or data to find and/or track the target object 130 in a Location Uncertainty Volume (LUV) 140. The LUV 140 can be of virtually any three-dimensional shape, such as a sphere, cylinder, cone, cube, rectangular prism, pyramid, ellipsoid, etc. The LUV 140 can represent an airspace volume or a range of potential locations in the air where the target object 130 may be at a given time.

In some cases, the sensor devices 102-112 can determine location parameters associated with the target object 130 based on a reflection from the target object 130 of a radar signal transmitted by a radar, a reflection from the target object 130 of a laser beam transmitted by a laser rangefinder, sound waves created by the target object 130 and/or its surrounding environment and captured by a sound sensor, image data captured by an optical sensor, and/or any other type of signal reflected from the target object 130, created by the target object 130 or its surrounding environment, or captured by one or more of the sensor devices 102-112. The location parameters can include, for example, a detected range of the target object 130, a detected angle of the target object 130, a detected elevation of the target object 130, a detected speed of target object 130, a detected distance to the target object 130, etc.

The sensor devices 102-112 can include, for example and without limitation, a radar sensor (e.g., 102), an optical sensor (e.g., 104) such as a camera sensor, an RF sensor (e.g., 106), a sound sensor (e.g., 108) such as a microphone, an automatic dependent surveillance-broadcast or ADS-B device (e.g., 110), and/or any other type and/or number of sensors (e.g., 112). In some cases, the sensor devices 102-112 can be implemented, integrated, or mounted on a respective system or object in the ground or in the air, such as a vehicle (e.g., UAV, aircraft, hot air balloon, a ground vehicle, etc.), a computing system (e.g., a server, a laptop computer, an IoT (Internet of Things) device, a network device (e.g., a switch, a router, a controller, an access point, etc.), a computer tracking system, a smart car, etc.), a structure (e.g., a tower, a building, an airport, a utility pole, a tree, a station, a hospital, a mountain, etc.), and so forth.

Each of the sensor devices 102-112 can include an interactive multiple model filter (IMMF) 114, which can include multiple filters 116, such as Kalman filters, for tracking a target object (e.g., 130) by using sensor data from the sensor devices 102-112 and respective target models to generate respective state estimates and error covariances for the target object (e.g., 130). In some cases, the filters 116 in the IMMF 114 can run in parallel. Moreover, the different filters 116 in an IMMF 114 can implement different target models for tracking a target object (e.g., 130), such as a nearly-constant velocity model, a nearly-constant acceleration model, a dynamic model, a random acceleration or velocity model, a linear model, a non-linear model, etc. The different target models can capture the various dynamics of the target object.

Moreover, the filters 116 in the IMMF 114 of a sensor device can process measurements or observations from the sensor device (e.g., 102-112) and use the filters 116 and respective target models to calculate a motion or location of the target object (e.g., 130), estimate or predict the target object's states (e.g., position, velocity, trajectory, acceleration, angle, altitude, etc.), calculate one or more tracks (e.g., estimated states and error covariances) for the target object, etc. The filters 116 can produce various results, which may depend on one or more factors such as the suitability of their respective target models for a particular type of motion of the target object (e.g., 130).

For example, a target object (e.g., 130) moving in a straight line with a constant speed can be accurately tracked with a nearly-constant velocity model. Thus, a filter (e.g., 116) implementing a nearly-constant velocity model can capture the dynamics of the target object when moving in a straight line at a constant speed. If the target object (e.g., 130) begins to maneuver, turn or accelerate, higher-ordered models, such as a nearly-constant acceleration model, may produce a more accurate result and/or better capture the different dynamics of the target object. Therefore, a filter (e.g., 116) implementing such a model may better capture the different dynamics of the target object.

The multiple filters 116 and the different target models implemented by the filters 116 can be implemented in combination to better capture the different dynamics of the target object (e.g., 130) as further described herein. In some cases, the tracks generated by the different filters 116 in an IMMF 114 can be combined or fused to generate a single track. Using the multiple filters 116, the IMMF 114 can thus track a target object (e.g., 130) over a wide range of dynamics.

Moreover, the IMMF 114 in a sensor device (e.g., 102-112) can monitor the performance of the filters 116 in the IMMF 114 and assign a respective weight to each of the filters 116 in the IMMF 114 based on how well the respective models represent the target object's (e.g., 130) motion at a given time. The model weights can be used to combine the output of the filters 116 in the IMMF 114 to yield a single state estimate and error covariance (e.g., a single track) for the target object. In some cases, each model weight can be a number between 0 and 1, and the sum of all model weights can equal to 1.

In some cases, a classifier 118 can also be implemented to help identify the target object 130. The classifier 118 can obtain sensor measurements for the target object 130, such as image data, sound, movement patterns, location parameters, object characteristics (e.g., size, shape, etc.), and/or any other sensor data, and generate a classification 120 for the target object 130. The classification 120 can identify, for example, the type of object, the identity of the object, the characteristics of the object, etc. In some aspects, the classification 120 can also identify, or be used to identify, other information about the target object 130, such as whether the target object 130 is a cooperative or non-cooperative object or vehicle, whether the target object 130 is authorized to be in its current or predicted location, etc.

The classifier 118 can be implemented by one or more of the sensor devices 102-112, one or more remote or external systems such as a server or a tracking system, one or more systems or objects implementing, integrating, and/or housing one or more of the sensor devices 102-112, etc. For example, in some cases, each of the sensor devices 102-112 can implement a respective classifier. In other examples, the classifier 118 can be implemented by an external system or object such as a server or tracking system in communication with one or more of the sensor devices 102-112. In yet other examples, the classifier 118 can be implemented by an aircraft, such as a UAV, that houses, implements, and/or integrates one or more of the sensor devices 102-112.

Figure 1B:
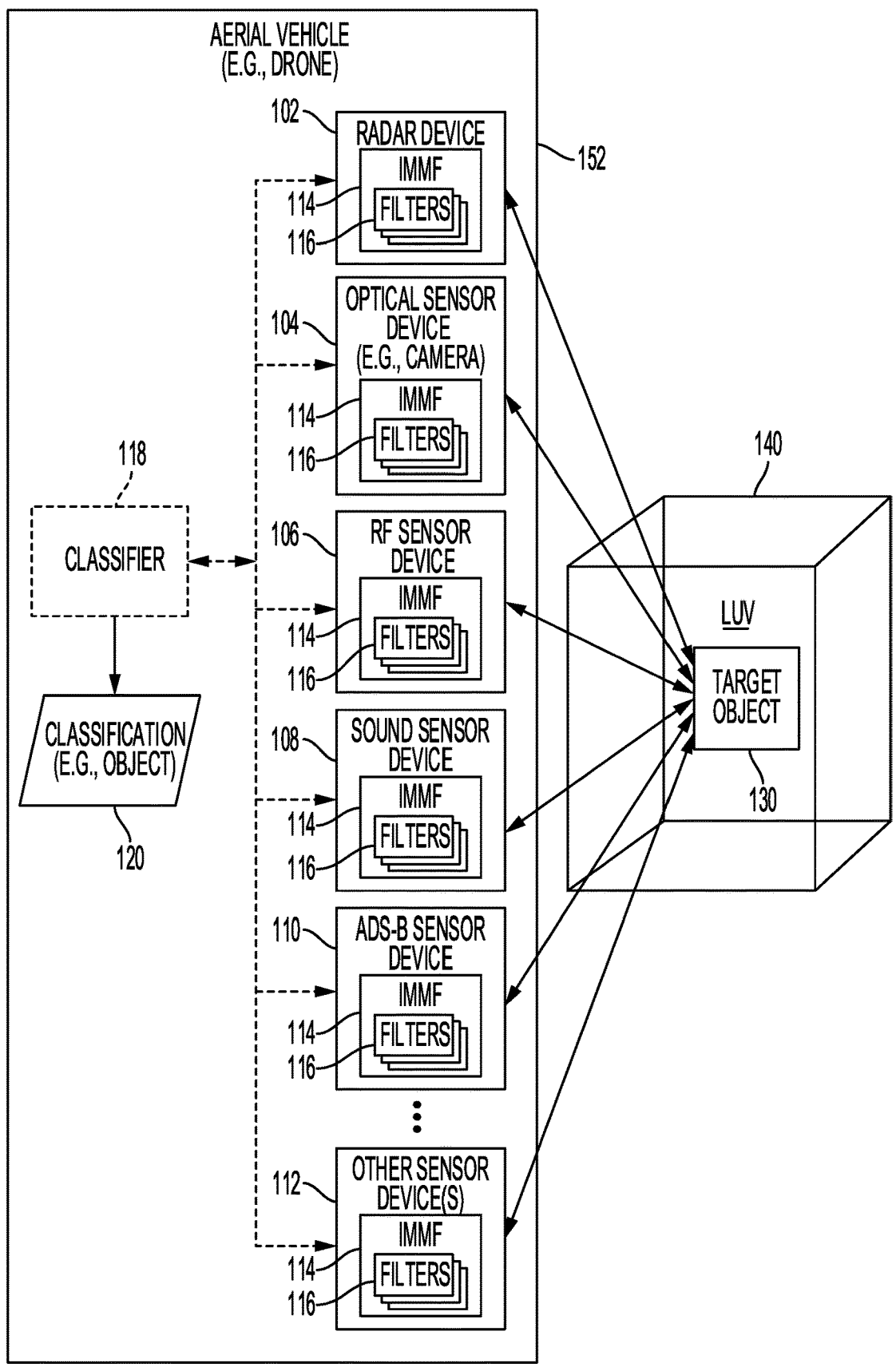

To illustrate, with reference to FIG. 1B, an aerial vehicle 152 can implement the sensor devices 102-112 and the classifier 118. The aerial vehicle 152 can use the sensor devices 102-112 and/or the classifier 118 to track and/or classify or identify the target object 130. The aerial vehicle 152 can also use the sensor devices 102-112 and/or the classifier 118 to monitor the target object 130. Moreover, the aerial vehicle 152 can communicate with other vehicles, sensor devices, tracking systems, etc., to exchange sensor and/or tracking data and track the target object 130 in a distributed manner.

Figure 2:
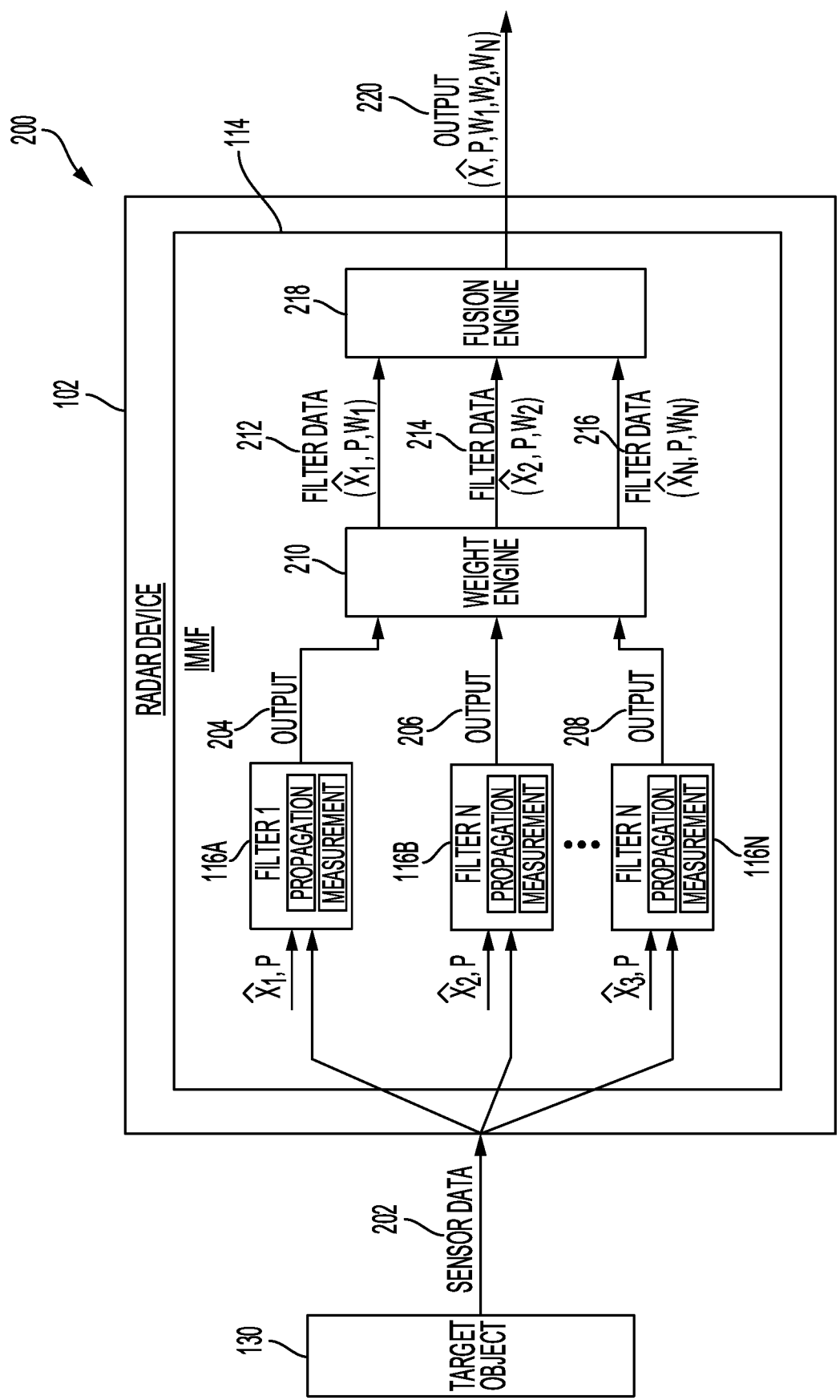
FIG. 2 illustrates an example implementation of an interactive multiple model filter (IMMF) by a sensor device.

FIG. 2 illustrates an example implementation 200 of an IMMF 114 in a radar device 102. Here, the IMMF 114 includes different filters 116A, 116B, 116N for tracking the target object 130. The different filters 116A, 116B, 116N in the IMMF 114 can be implemented in combination to track a wider range of dynamics for the target object 130. For example, as previously explained, the different filters 116A, 116B, 116N can implement different target models. To illustrate, filter 116A may implement a constant or near-constant velocity model, filter 116B may implement a constant or near-constant acceleration model, and filter 116N may implement some other type of model such as a dynamic model or a random velocity or acceleration model. The different target models implemented by the different filters 116A, 116B, 116N can allow the combination of filters to capture a wider range of dynamics by, for example, combining/fusing their respective results (e.g., state estimates, covariances, etc.) or selecting the result that best fits or captures the state or dynamics of the target object 130.

For example, if the target object 130 is traveling at a constant velocity and one of the filters 116A, 116B, 116N implements a constant or near-constant velocity model, then the output or estimated state from that particular filter may better capture the target object's dynamics than the other filters. Thus, in some cases, the output or estimated state from that particular filter may be selected over the output or estimated state from the other filters or otherwise fused/combined with the output or estimated states from the other filters.

In this example implementation 200, the filters 116A, 116B, 116N can obtain sensor data 202 captured by the radar device 102 for the target object 130 and use the observed measurement(s) from the sensor data 202 to update or adjust the predicted state calculated by the filters 116A, 116B, 116N. The sensor data 202 can include radar returns representing observed measurements, such as location parameters (e.g., range, angle, velocity, position, etc.), captured by the radar device 102 for the target object 130. The filters 116A, 116B, 116N can implement a predict equation together with their respective motion models to predict the state of the target object 130. For example, in some cases, the predict equation can use the state and covariance predicted at a previous time step (e.g., time step t—1), along with the respective motion model, to predict the state of the target object 130 for a future or current time step (e.g., time step t).

The state information (e.g., state calculated at previous time step t-1) used by the predict equation of the filters 116A, 116B, 116N to predict the state of the target object 130 can include, for example, a vector of position values, such as position X (e.g., position up), position Y (e.g., position down), and position Z (e.g., position east or west); and velocity values, such as velocity X (e.g., velocity up), velocity Y (e.g., velocity down), and velocity Z (e.g., velocity east or west). The filters 116A, 116B, 116N can combine the observed measurements (e.g., from sensor data 202) with the state calculated by the predict equation (e.g., state predicted for time step t) to update the state and generate an output state estimated by the filters 116A, 116B, 116N for the target object 130.

In some examples, the filters 116A, 116B, 116N can each perform a propagation step and a measurement step. In the propagation step, each filter (116A, 116B, 116N) can take its respective state and covariance and propagate that to a future time (e.g., time step t+1). In the measurement step, each filter (116A, 116B, 116N) can then use the sensor data 202 to calculate an accuracy or likelihood of accuracy of the output (e.g., propagated state and covariance) from the propagation step. The filters 116A, 116B, 116N can generate outputs 204, 206, and 208, which can include the respective measurements (e.g., state and covariances, measured accuracies of the state and covariances, and/or raw data from the sensor data 202) from the filters 116A, 116B, 116N, and feed the outputs 204, 206, and 208 to weight engine 210.

The weight engine 210 can use the outputs 204, 206, and 208 to calculate respective weights for the filters 116A, 116B, 116N based on, for example, how well the respective motion models used by the filters 116A, 116B, 116N represent the motion of the target object 130 at a given time. In some cases, the weight engine 210 can compare the outputs 204, 206, and 208 from the filters 116A, 116B, 116N and calculate the respective weights based on the respective accuracy of the outputs 204, 206, and 208, the respective performance or accuracy of the filters 116A, 116B, 116N, and/or how well the respective motion models of the filters 116A, 116B, 116N represent the motion of the target object 130. Each of the weights generated by the weight engine 210 can be a number between 0 and 1, and the sum of all the weights can equal to 1.

Once the weight engine 210 has calculated the weights for the filters 116A, 116B, 116N, the fusion engine 218 can obtain the filter data 212, 214, and 216, which can include the weights and the state and error covariance values associated with the filters 116A, 116B, 116N, fuse the state and error covariance values associated with the filters 116A, 116B, 116N, and generate an output 220 including a fused error and covariance and the respective weights associated with the filters 116A, 116B, 116N.

When fusing the state and covariance values, the fusion engine 218 can generate a single state estimate and covariance for the filters 116A, 116B, and 116N. In some cases, the fusion engine 218 can compare and/or combine the state and covariance values associated with the filters 116A, 116B, 116N to determine a state and covariance that best represents the motion of the target object 130 (e.g., the most accurate state and covariance and/or the state and covariance with the highest estimated likelihood of being accurate).

Once the IMMF 114 has generated the output 220, the radar device 102 can provide the output 220 to a track fusion system or center, which can perform track fusion operations as further described below with respect to FIG. 3.

While the radar device 102 is shown in FIG. 2 with a single IMMF, it should be understood that, in some examples, the radar device 102 can implement multiple IMMFs for tracking one or more targets, with each IMMF 114 including multiple filters (e.g., 116A, 116B, 116N). For example, in some cases, the radar device 102 can implement n number of IMMFs where n is greater than one. In such implementations, each IMMF can track a target object, which can be a same or different object as the object tracked by any of the other IMMFs in the radar device 102.

Figure 3:
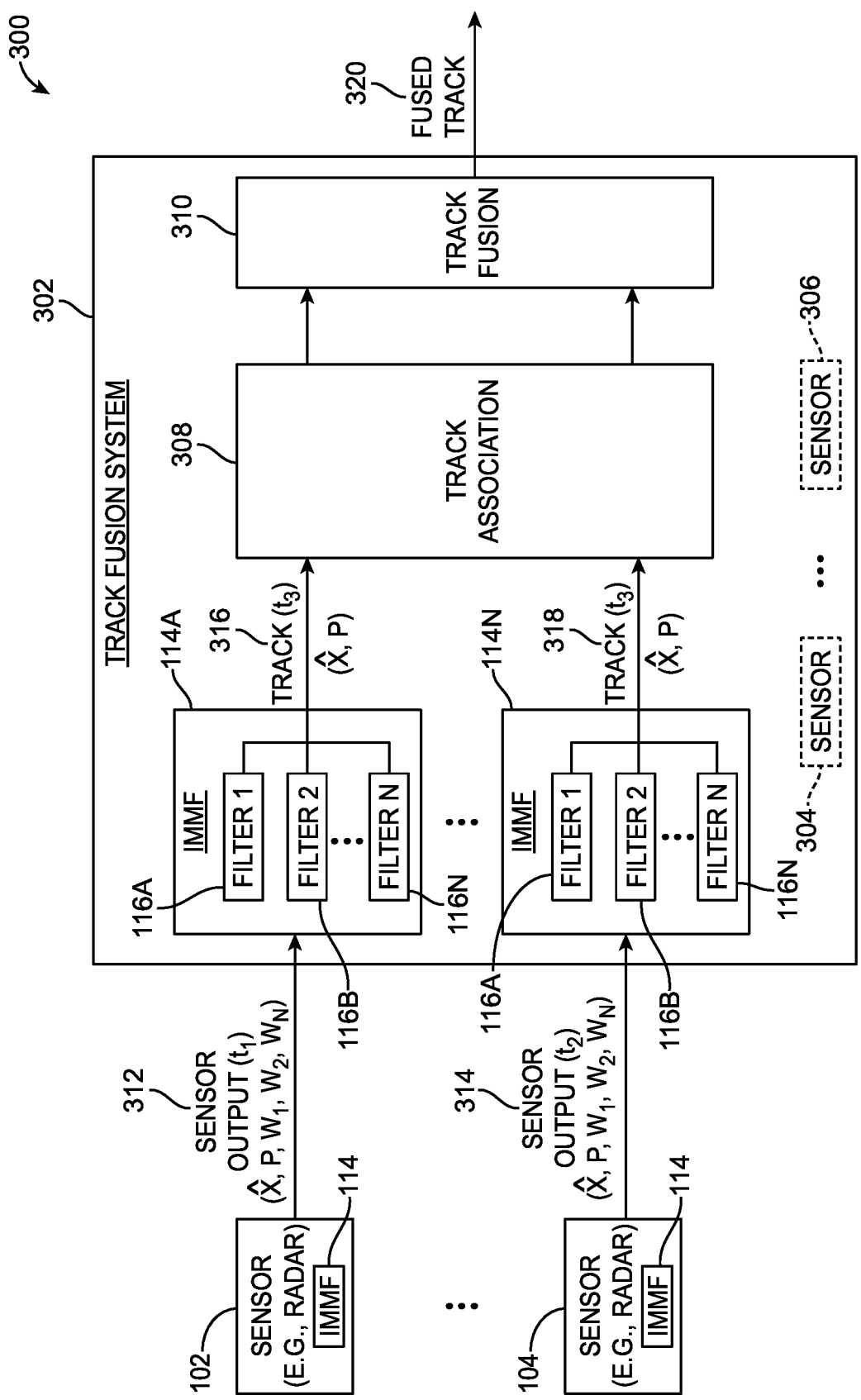
FIG. 3 illustrates an example multi-sensor implementation for tracking the state of a target object.

FIG. 3 illustrates an example multi-sensor implementation 300 for tracking the state of the target object 130. In this example, the multi-sensor implementation 300 includes a track fusion system 302 for generating tracks for the target object 130 based on sensor outputs 312-314 from multiple sensor devices 102-104. The track fusion system 302 can include one or more computing devices such as, for example, a server, a laptop computer, a smart vehicle (e.g., a smart car, a smart UAV, an aircraft, etc.), a desktop computer, a mobile device, a sensor device, a tablet computer, a server farm, a datacenter, a cloud server or application, a virtual machine (VM), a software container, an endpoint device, a network device (e.g., a switch, a router, a controller, etc.), or any other variation.

For example, in some cases, the track fusion system 302 can be a central processor(s) and/or centralized computing device(s). In other cases, the track fusion system 302 can be a distributed computing system. In yet other cases, the track fusion system 302 can be an object or device having one or more compute resources for implementing the track fusion system functionalities, such as a UAV having one or more compute resources, a control tower having one or more compute resources, an application service running on one or more cloud compute resources, etc. Moreover, in some cases, the track fusion system 302 can include sensors 304, 306 which it can use to take sensor measurements for a target (e.g., 130) and/or supplement the data (e.g., sensor outputs) obtained from one or more of the sensor devices 102-104.

One of the challenges of using track data from multiple sensor devices (102-104) is that some or all of the sensor devices (102-104) may be asynchronous with respect to each other, which means that they may produce measurements or estimates at different times, which can cause misalignment in the time of the state estimates or tracks from different sensor devices (102-104). Moreover, the processing and communication of track information from the sensors devices (102-104) to the track fusion system 302 introduces latency, further misaligning state estimates or tracks from the different sensor devices (102-104). The misalignment in time can degrade the performance of the track fusion system 302 and the accuracy of the output result.

To avoid the pitfalls of track misalignment, the track fusion system 302 can time align the state estimates and error covariances, or tracks, received from the different sensor devices (102-104). In some cases, to time align state estimates and error covariances, the track fusion system 302 can propagate the state estimates and error covariances to a common time step using an IMMF propagation step. To perform such propagation, the IMMFs 114A-N at the track fusion system 302 can run the same filter(s) (e.g., 116A, 116B, 116N) used by the sensor devices 102-104. In some cases, to implement the same filters (e.g., 116A, 116B, 116N) at the IMMFs 114A-N on the track fusion system 302, the sensor devices 102-104 can transmit the state estimates and error covariances of the filters (e.g., 116A, 116B, 116N) to the track fusion system 302. However, such transmission can place a large burden on the communication link.

For example, consider a tracking scenario where the 3D (three dimensional) position and velocity components of the target object 130 are being tracked by the sensor devices 102-104 using the filters 116A, 116B, 116N in their respective IMMFs 114. In this example, each model would be represented by 6 variables for the state estimate and 36 variables for the error covariance (which can be a square matrix). Given the 3 models used by the IMMF 114 in this example (e.g., filters 116A, 116B, 116N), the total number of variables for all three filters (116A, 116B, 116N) would equate to 126 variables for each track. Thus, the sensor devices 102-104 would each send 126 variables for each track to the track fusion system 302, placing a significant burden on the communication link.

To reduce the burden placed on the communication link by the information transmitted from the sensor devices 102-104 to the track fusion system 302, one or more strategies can be implemented to reduce the amount of data transmitted by the sensor devices 102-104 to the track fusion system 302. In some cases, an example strategy for reducing the amount of data transmitted can make simplifying assumptions and take advantage of the structure of the model parameters. For example, instead of communicating the estimated state and error covariance for each model of each IMM track, the sensor outputs 312-314 communicated by the sensor devices 102-104 may include the fused state estimate and error covariance (e.g., fused state and error covariance in output 220 shown in FIG. 2), which again represents a single state estimate and covariance, and the respective model weights or a subset of the model weights calculated by the weight engine 210 and included in the output 220 of the sensor devices as shown in FIG. 2.

To illustrate, the sensor output 312 from sensor 102 can include the output 220 generated by the sensor 102 in the example implementation 200 shown in FIG. 2, which includes a fused state estimate and error covariance as well as the respective weights calculated by the weight engine 210 for the filters 116A-N in the IMMF 114 on the sensor 102. Similarly, the sensor output 314 from sensor 104 can include a fused state estimate and error covariance calculated by a fusion engine (e.g., 218) on the sensor 104 for the filters 116A-N in the IMMF 114 on the sensor 104 as well as respective weights calculated by a weight engine (e.g., 210) on the sensor 104 for the filters 116A-N in the IMMF 114 on the sensor 104. In other words, each of the sensor outputs 312 and 314 can include a single state estimate and error covariance fused from state estimates and error covariances calculated by the filters 116A-N in the IMMF 114 on the sensor that generated the sensor output, as well as weights calculated for each of the filters 116A-N and/or state estimates and error covariances associated with that sensor.

The sensor outputs 312 and 314 may not be time aligned, which can create track misalignment and tracking errors as previously explained. To illustrate, in the example shown in FIG. 3, the sensor output 312 from sensor 102 is associated with time $t_1$ while the sensor output 314 from sensor 104 is associated with time $t_2$. Accordingly, when the track fusion system 302 receives the sensor outputs 312 and 314 from the sensors 102 and 104, it can perform a propagation step to propagate the track information (e.g., state estimates and error covariances) in the sensor outputs 312 and 314 to a common time step (e.g., time step $t_3$). Once the track information has been propagated to a common time step (e.g., time aligned), the track fusion system 302 can associate tracks that are determined to represent the same target object and fuse such tracks to generate a single fused track.

In some examples, the IMMF 114A on the track fusion system 302 can receive the sensor output 312 from sensor 102 and the IMMF 114N on the track fusion system 302 can receive the sensor output 312 from sensor 102. The IMMFs 114A-N on the track fusion system 302 can use the filters 116A-N on each of the IMMFs 114A-N to propagate the track information in the sensor outputs 312 and 314 to a common time step. For example, the IMMF 114A can use the filters 116A-N on IMMF 114A to propagate the track information in the sensor output 312 from time step $t_1$ to time step $t_3$, and the IMMF 114N can use the filters 116A-N on IMMF 114N to propagate the track information in the sensor output 314 from time step $t_2$ to time step $t_3$. This way, the track information (e.g., state estimates and error covariances) in the sensor outputs 312 and 314 are time aligned and can be more accurately compared, associated, and/or fused.

In some cases, the IMMFs 114A-N can use respective weights included in the sensor outputs 312 and 314 to determine which filters (116A-N) contributed to the track information in the sensor outputs 312 and 314, how much (e.g., 10%, 40%, 50%) each of the filters (116A-N) contributed to the track information in the sensor outputs 312 and 314, and/or the respective accuracies associated with the filters (116A-N). The IMMFs 114A-N can use this information to determine which motion model(s) to trust and use for propagating the track information from the sensor outputs 312 and 314. For example, if filter 116A on IMMF 114A is determined to be the most accurate (e.g., based on the weights) from the filters in IMMF 114A and filter 116A implements an acceleration motion model, the IMMF 114A can apply an acceleration factor when propagating the track information in the sensor output 312.

In some cases, the IMMF 114A and/or 114N can use a single motion model and/or filter when propagating the track information, such as the most accurate motion model and/or filter in the respective IMMF. In other cases, the IMMF 114A and/or 114N can use two or more filters (e.g., two or more of filters 116A, 116B, and 116N) to propagate the track information. For example, the IMMFs 114A-N can use all of the filters 116-N and/or associated motion models in each IMMF proportionally based on their respective accuracies and/or weights. In another illustrative example, the IMMFs 114A-N can use the top n number of most accurate filters and/or motion models in each IMMF to propagate the track information. To illustrate, if filters 116A and 116B in IMMF 114A are estimated to be the most accurate and their associated motion models include an acceleration model and a velocity model, IMMF 114A may rely on filters 116A and 116B and/or apply an acceleration factor and a velocity factor when propagating the track information in the sensor output 312.

Once the track information in the sensor outputs 312 and 314 have been propagated, the IIVIMFs 114A and 114N can output time aligned tracks 316 and 318, which have been aligned to a common time step and can include a respective state estimate and error covariance. The track fusion system 302 can then use the time aligned tracks 316 and 318 to perform track association 308 to associate those tracks (e.g., state estimates and error covariances) from the IMMFs 114A-N that are determined to match or represent a same target object. By ensuring that the track information from the various sensors (102, 104, etc.) are time aligned, the track fusion system 302 can more accurately identify which tracks from the sensors represent a same target object. This allows the track fusion system 302 to fuse the correct tracks (e.g., the tracks representing a same target object) to advantageously leverage track information from multiple sensors for tracking a target object (e.g., 130) and avoid combining track information corresponding to different target objects.

The track fusion system 302 can then perform track fusion 310 to fuse the associated tracks determined to correspond to the same track to generate a fused track 320. The track fusion system 320 can thus generate a single fused track based on multiple tracks associated with each other at the track association 308 step. The track fusion system 302 can time align, associate, and fuse any number of tracks or track information (e.g., state estimates and error covariances) from any number of sensors (e.g., 102-112). Such track fusion strategies can increase the tracking accuracy by leveraging sensor and track information from multiple sensors and ensuring that the track information from the different sensors is properly combined and applied.

Moreover, the example strategy herein for transmitting track information from multiple filters and sensors can reduce the amount of data (e.g., sensor outputs 312-314) communicated by the sensors (e.g., 102 and 104) for each sensor to a single fused state estimate and error covariance, and the weights for each filter (e.g., filters 116A-N) in each IMMF (114) on each sensor. The amount of data can be further reduced by taking advantage of the fact that the error covariance is a symmetric matrix and can be fully represented by either the upper or lower triangle. Moreover, since the model weights for all filters associated with a given IMMF sum to 1, the full set of weights can be derived from a subset of n-1 model weights, where n is the number of models used in each IMMF.

For example, assume a weight associated with filter 116A equals 0.5, a weight associated with filter 116B equals 0.3, and a weight associated with filter 116N equals 0.2. If only two of the three weights are transmitted, the third weight may be derived from the two weights transmitted based on the fact that the three weights sum to 1. Thus, in this example, if only the weights associated with filters 116A and 116B (weight 0.5 and weight 0.3) are transmitted, which together equal 0.8, the third weight associated with filter 116N would have to equal 0.2, which can be inferred by subtracting the sum of the weights associated with filters 116A and 116B from 1 (e.g., 1.0−0.8=0.2). Accordingly, the amount of data communicated by each sensor can be further reduced by transmitting a subset of the model weights, as opposed to the full set of weights. Thus, in comparison to the 126 variables transmitted for each IMMF output in the example above where all state estimates, covariances and weights are transmitted, in this example, the reduced data communicated by each of the sensors 102-104 (e.g., sensor outputs 312 and 314) may instead include only 6 state estimate variables, 21 error covariance variables, and 2 model weights, for a total of 29 variables.

Therefore, in some cases, to reduce, mitigate, or eliminate issues with time misalignment of tracks, latency, and the burden on the communication link, the sensor outputs 312 and 314 transmitted by the sensors 102-104 in the multi-sensor implementation 300 can include a reduced amount of variables as described above. The track fusion system 302 can receive such reduced data (e.g., 312-314), run the filters 116A-N in the IIMMFs 114A-N, and associate and fuse tracks (e.g., by performing track association 308 and track fusion 310) to generate a fused track 320 representing a single state estimate and error covariance.

Figure 4:
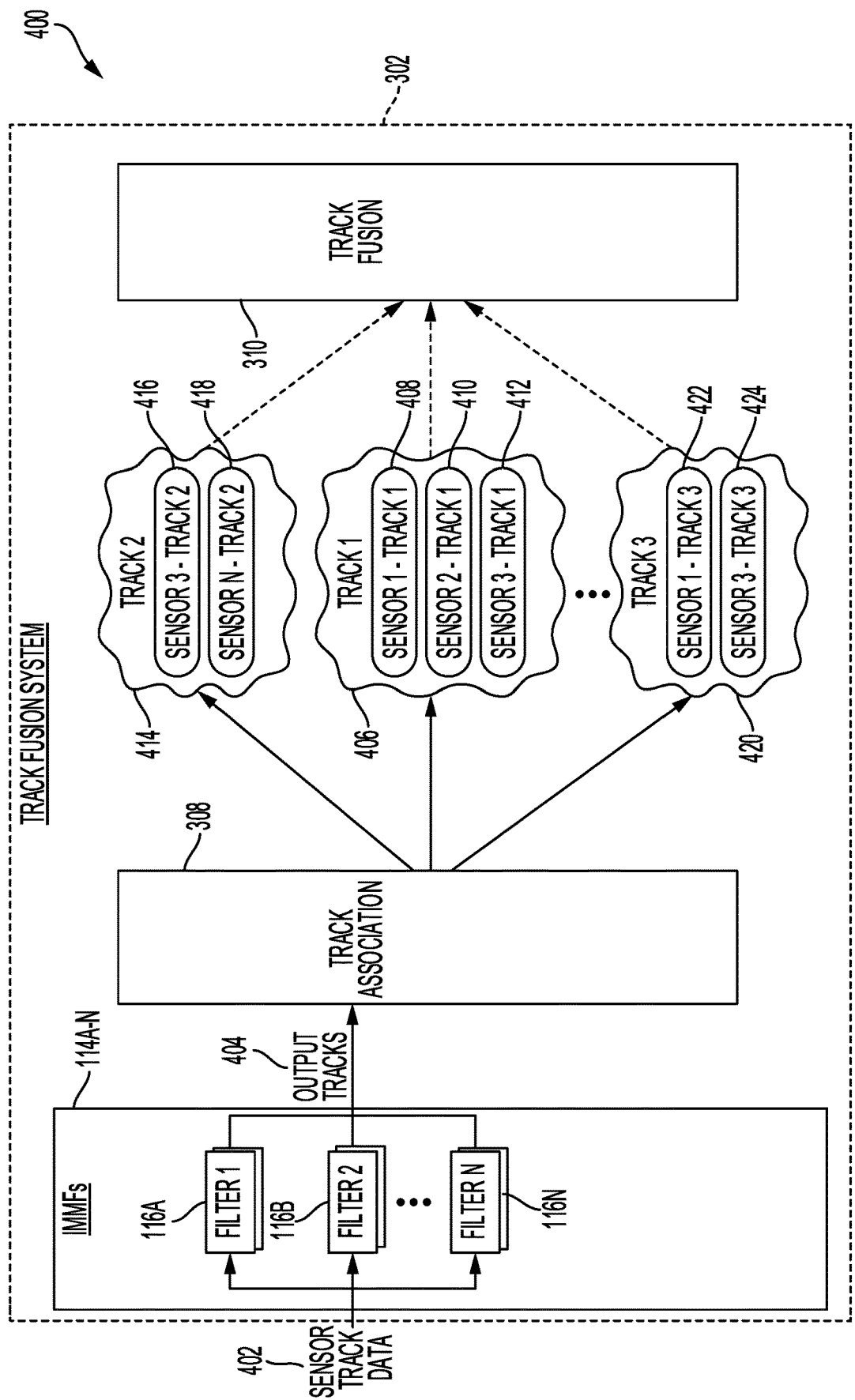
FIG. 4 illustrates an example flow of a track association process.

FIG. 4 illustrates an example flow 400 of a track association process (308). In this example, the IMMF 114 in the track fusion system 302 can receive sensor track data 402 from sensor devices (e.g., 102-112) and use the parameters in the sensor track data 402 (e.g., state estimate variables, error covariance variables, and weights associated with fused filter data from the sensor devices) to initialize the filters 116A-N in the IMMF 114 on the track fusion system 302. The filters 116A-N can mirror or represent the same filters used by sensor devices (e.g., 102-112) to produce the sensor track data 402.

Moreover, the track fusion system 302 can process the sensor track data 402 and perform a filter propagation step to generate output tracks 404 that are time aligned. The filter propagation step can involve propagating the tracks associated with the sensor track data 402 to a common time step so they are time aligned. Time aligned tracks (e.g., 404) can be compared and associated with greater accuracy than time misaligned tracks. Therefore, the propagation step allows the output tracks 404 to be compared and associated, as described herein, with much greater accuracy.

The track fusion system 302 can use the output tracks 404 to perform track association 308 by comparing the output tracks 404 and associating those that are determined to be or represent the same track. As shown in FIG. 4, the track association 308 can produce track associations 406, 414, and 420, each of which contains instances of the same track. For example, track 1 association 406 can include an instance 408 of track 1 from sensor 1 (e.g., 102), an instance 410 of track 1 from sensor 2 (e.g., 104), and an instance 412 of track 1 from sensor 3 (e.g., 106). The instances 408-412 can represent tracks that have been determined to match or represent the same track, namely track 1.

Similarly, track 2 association 414 can include an instance 416 of track 2 from sensor 3 (e.g., 106) and an instance 418 of track 2 from sensor N (e.g., 112). The instances 416-418 can represent tracks that have been determined to match or represent the same track, namely track 2. Track 3 association 420 can include an instance 422 of track 3 from sensor 1 (e.g., 102) and an instance 424 of track 3 from sensor 3 (e.g., 106). The instances 422-424 can represent tracks that have been determined to match or represent the same track, namely track 3.

Figure 5:
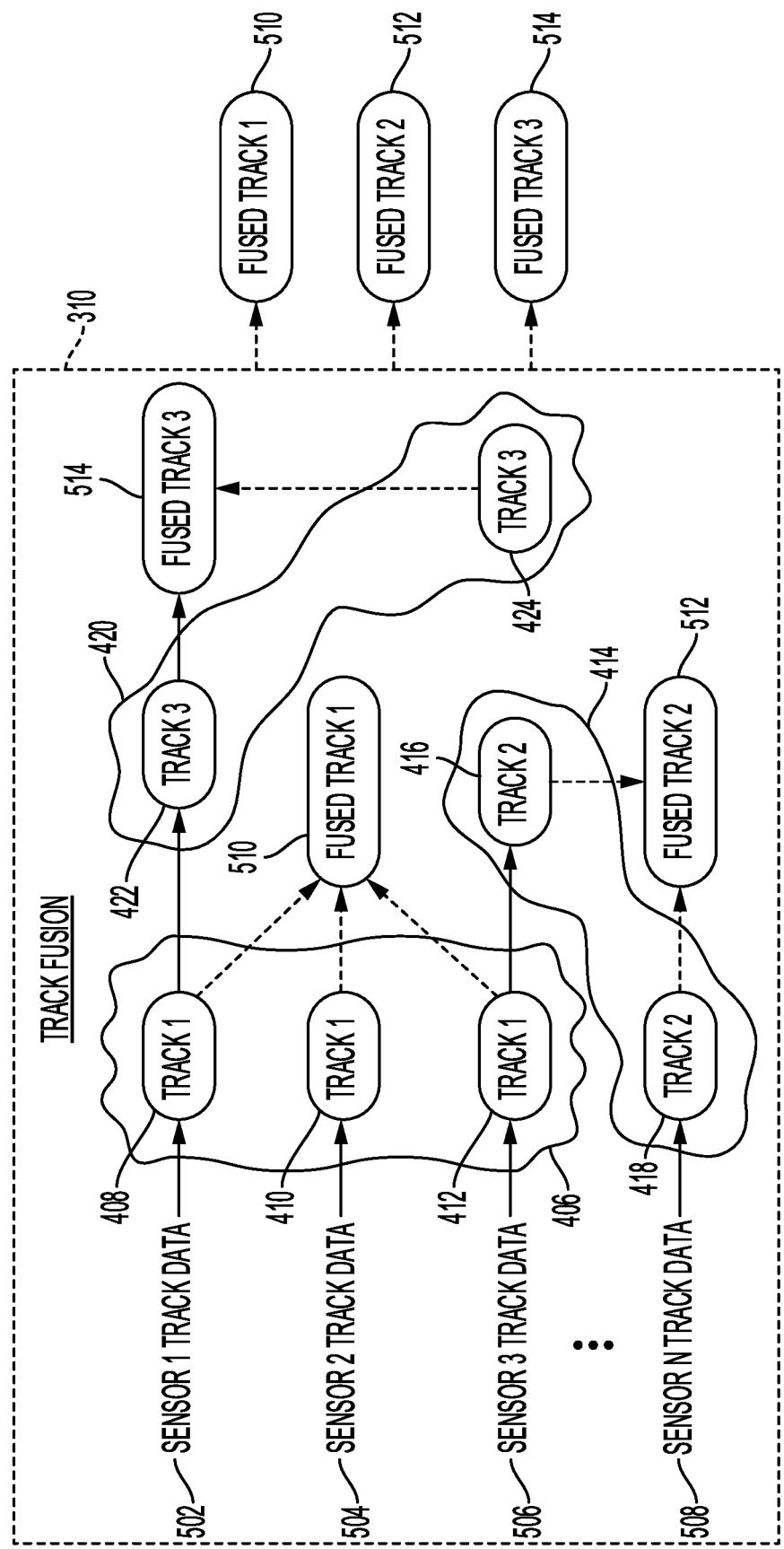
FIG. 5 illustrates an example track fusion process.

The track associations 406, 414 and 420 can then be used to perform track fusion 212. With reference to FIG. 5, the track associations 406, 414 and 420 generated by the track association 308 can include track data from multiple sensor devices (e.g., 102-112). In this example, track association 406 includes an instance 408 of track 1 from sensor 1, an instance 410 of track 1 from sensor 2, and an instance 412 of track 1 from sensor 3. Track association 414 includes an instance 416 of track 2 from sensor 3 and an instance 418 of track 2 from sensor N. Track association 420 includes an instance 422 of track 3 from sensor 1 and an instance 424 of track 3 from sensor 3.

Thus, the sensor 1 track data 502 can include track 1, which has been associated with other instances of track 1 in the track 1 association 406; and track 3, which has been associated with other instances of track 3 in the track 3 association 420. The sensor 2 track data 504 can include track 1, which has been associated with other instances of track 1 in the track 1 association 406. The sensor 3 track data 506 can include track 1, which has been associated with other instances of track 1 in the track 1 association 406; track 2, which has been associated with other instances of track 2 in track 2 association 414; and track 3, which has been associated with another instance of track 3 in the track 3 association 420. The sensor N track data 508 can include track 2, which has been associated with another instance of track 2 in the track 2 association 414.

With those of the various tracks (e.g., 502-508) determined to be or represent the same respective tracks being associated with each other, track fusion 310 can be performed to fuse the tracks in each of the track associations 406, 414, 420 into a single fused track. For example, the instances 408, 410, 412 of track 1 in track association 406 can be fused into a single fused track 510 representing track 1.

Similarly, the instances 416, 418 of track 2 in track association 414 can be fused to generate a fused track 512 representing track 2. Finally, the instances 422, 424 of track 3 in track association 420 can be fused to generate a fused track 514 representing track 3. The output from the track fusion 212 in this example can thus include fused track 510 representing track 1, fused track 512 representing track 2, and fused track 514 representing track 3.

FIG. 6A illustrates an example configuration 600 for distributed tracking. In this example, sensor devices 102-112 and track fusion system 302 can form a distributed network of trackers for collecting sensor data for a target object (e.g., 130), generating tracks for the target object, sharing sensor data collected and/or tracks generated, and/or generating fused tracks based on sensor data and/or tracks from different sensor devices (e.g., 102-112). Each of the sensor devices 102-112 can communicate with the track fusion system 302 and/or one or more other sensor devices 102-112 to exchange sensor data and/or track data.

In some cases, the sensor devices 102-112 and track fusion system 302 can communicate based on a particular hierarchy, topology, designated roles, etc. For example, some sensor devices can be designated to report sensor data and/or track data, and other sensor devices can be configured to receive sensor data and/or track data from multiple sensor devices and generate fused tracks, which can be communicated to the track fusion system 302 to generate a centralized version of fused tracks based on the sensor data and track data from the multiple sensor devices 102-112.

To illustrate, sensor devices 102-108 may be configured to generate sensor data or measurements, produce fused track data, and communicate the fused track data to sensor devices 110 and 112. In some aspects, the sensor devices 110 and 112 can receive fused track data from the sensor devices 102-108, associate tracks in the fused track data that represent a same track, and generate fused tracks based on track associations from the fused track data received from the sensor devices 102-108. In other aspects, the sensor devices 110 and 112 can receive the fused track data from the sensor devices 102-108 and fuse the track data with track data generated by the sensor devices 110 and 112 and/or process the data for communication to track fusion system 102, which can perform track fusion based on the received track data.

The sensor devices 110 and 112 can be configured to receive fused track data from all of the sensor devices 102-108, different subsets of the sensor devices 102-108, some or all of the same sensor devices, any sensor devices that are within a communication range or an object tracking or detection range, any sensor devices that have a communication link with the sensor devices 110 and/or 112, or any other static or dynamic (e.g., based on one or more factors such as location, range, connection, etc.) mapping of the sensor devices 102-108 and the sensor devices 110 and 112.

The sensor devices 110 and 112 can communicate some or all of the track data from the fused track data they generate to the track fusion system 302, which can then generate a single fused track for all the different tracks in the track data. The track fusion system 302 can perform track association (308) and track fusion (310) as previously explained, to generate a single fused track from all of the tracks in the track data that are determined to represent the same track. Thus, the track fusion system 302 can leverage sensor data and tracks generated from multiple sensor devices 102-112 to produce, for each unique track, a fused track that is based on the sensor data and tracks from the various sensor devices 102-112. This can result in greater tracking accuracy and performance, and greater geographical tracking coverage.

FIG. 6B illustrates another example configuration 620 for distributed tracking. In this example configuration 620, multiple track fusion systems 302A-G are implemented in a particular communication topology or hierarchy to function as a distributed track fusion system. Each track fusion system (302A-G) can receive and/or process track data from one or more sensor devices (102-112) and/or track fusion systems (302A-G). For example, track fusion system 302D can receive track data (e.g., fused tracks) from track fusion systems 302A-C and serve as a centralized tracking or track processing system for the track fusion systems 302-C.

Track fusion system 302D can generate fused tracks from the track data it receives from track fusion systems 302A-C, and communicate the generated fused tracks to track fusion systems 302E-G. Track fusion systems 302E-G can receive the fused tracks from the track fusion system 302D and store the fused tracks for future access or use and/or generate track data such as fused tracks from the track data (e.g., fused tracks) received from the tracking fusion system 302D (and any other device or system such as one or more sensor devices or track fusion systems). In some cases, the track fusion systems 302E-G can store the received track data from the track fusion system 302 for use in tracking one or more targets, monitoring one or more targets, collecting target tracking or motion statistics, providing a repository of track data for access by other systems or devices, generating alerts or notifications, generating collision avoidance plans or instructions, managing flight or travel paths, and/or any other use of tracking data.

The distributed tracking in the example configuration 620 can provide a greater amount of track data for greater tracking accuracy, and can increase the geographical tracking range or coverage. To reduce or limit the latency of communications between the track fusion systems 302A-G and the congestion or burden on the communication links, the track data communicated between the track fusion systems 302A-G can be reduced as previously described with respect to FIG. 3.

Figure 7:
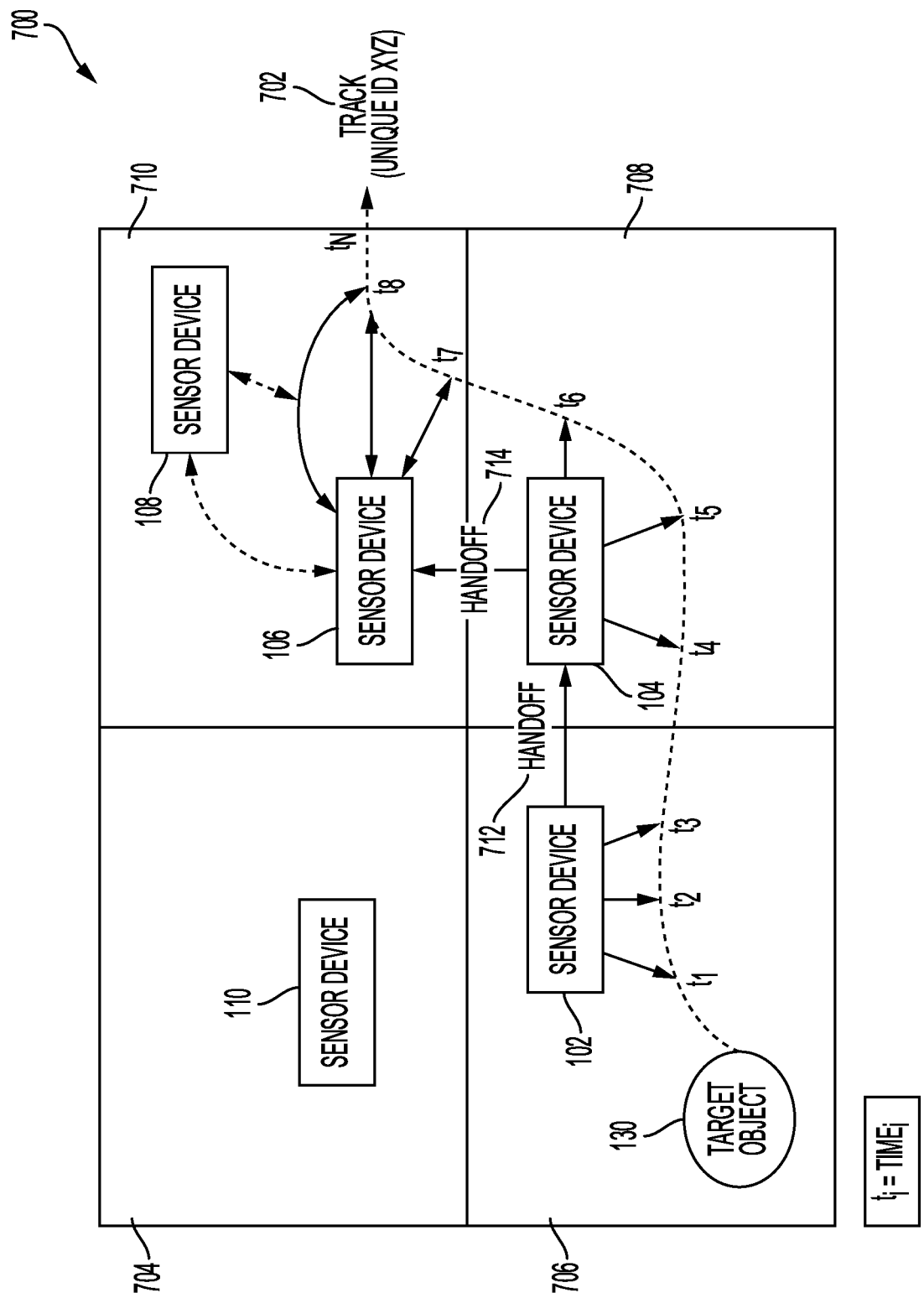
FIG. 7 illustrates an example tracking scenario.

FIG. 7 illustrates an example tracking scenario 700. In the example tracking scenario 700, sensor devices 102-110 are located in different airspace regions 704-710 and can monitor and/or track objects while located in the different airspace regions 704-710. Each of the sensor devices 102-110 can track objects within range and, if the object moves out of range, can handoff any sensor data and/or tracking data generated to one or more sensor devices or track fusion systems within range of the object.

Track 702 represents the path traveled by the target object 130 across airspace regions 706, 708 and 710 from time $t_1$ to $t_n$. Sensor devices 102, 104, 106, 108 can fall within tracking range of the target object 130 at different times and can help track the target object 130 while in tracking range of the target object 130. The sensor devices 102, 104, 106, 108 can perform handoffs 712, 714 as necessary to continue the tracking the target object 130 as it moves across the airspace regions 706-710 and/or share tracking data with each other. In some cases, the sensor devices 102, 104, 106, 108 can assign a unique identifier (UID) to the track 702 and/or the target object 130 to identify the track 702 (or any data associated with the track 702) and/or the target object 130 in their communications with each other and/or their use of tracking information associated with the target object 130.

For example, at time ti, the target object 130 is located in the airspace region 706. Sensor device 102, which is also in the airspace region 706 and is within a tracking range of the target object 130, can obtain sensor data such as location parameters (e.g., position, velocity, acceleration, angle, altitude, trajectory, etc.) and track data (e.g., estimated state and error covariance) for the target object 130. Sensor device 102 can track the target object 130 while the target object 130 is within a tracking range at times $t_1$, $t_2$, and $t_3$.

At time $t_4$, the target object 130 moves to airspace region 708 and is no longer within tracking range for sensor device 102. However, at $t_4$, sensor device 104, which is located in the airspace region 708, is within tracking range of the target object 130 and can continue tracking the target object 130. Sensor device 102 can perform a handoff 712 to sensor device 104 to continue tracking of the target object 130 at airspace region 708. In some cases, at the handoff 712, sensor device 102 can instruct or request sensor device 104 to continue tracking the target object 130. Moreover, in some cases, at the handoff 712, sensor device 102 can communicate the estimated location and/or path of the target object 130 and/or any sensor data and/or track data (e.g., estimated state, error covariance, model weights, UID of track 702 and/or target object 130, etc.) to sensor device 104.

Sensor device 104 can obtain sensor data and track data (e.g., estimated state, error covariance, model weights, UID of track 702 and/or target object 130, etc.) for the target object 130 as it travels through airspace region 708 at times $t_4$ through $t_6$. At time $t_7$, the target object 130 moves to airspace region 710 and is no longer within tracking range for sensor device 104. However, at $t_7$, sensor device 106, which is located in the airspace region 710, is within tracking range of the target object 130 and can continue tracking the target object 130.

Sensor device 104 can thus perform a handoff 714 to sensor device 106 to continue tracking of the target object 130 at airspace region 710. In some cases, at the handoff 714, sensor device 104 can instruct or request sensor device 106 to continue tracking the target object 130. Moreover, in some cases, at the handoff 714, sensor device 104 can communicate the estimated location and/or path of the target object 130 and/or any sensor data and/or track data (e.g., estimated state, error covariance, model weights, UID of track 702 and/or target object 130, etc.) to sensor device 106.

Sensor device 106 can obtain sensor data and track data (e.g., estimated state, error covariance, model weights, UID of track 702 and/or target object 130, etc.) for the target object 130 as it travels through airspace region 708 at times $t_7$ through $t_n$. In some cases, sensor device 108, which is also located in airspace region 710 and is within tracking range of the target object 130, can also obtain sensor data and track data to track the target object 130 as it travels through airspace region 708 at times $t_7$ through $t_n$.

In some cases, sensor device 106 and sensor device 108 can communicate with each other and collaborate in the tracking of the target object 130 as it travels across airspace region 710 or at specific times or locations during the traveling of the target object 130 across the airspace region 710. For example, the sensor devices 106 and 108 can collect different sensor measurements for the target object 130, share their respective sensor measurements with each other (or one sensor device with the other), generate respective tracking data (e.g., estimated state, error covariance, model weights, etc.), and share their respective tracking data with each other (or one sensor device with the other), to achieve a more accurate tracking result and tracking redundancy.

In some cases, one of the sensor devices (e.g., 106) can share sensed data and/or tracking data (e.g., state estimate variables, error covariance variables, weights, etc.) with the other (e.g., 108). The other, receiving sensor device (e.g., 108) can use the received data (e.g., from sensor device 106)

to perform track fusion and/or track calculations, compare the received data with its own tracking data in order to identify or use the most accurate (or best performing) tracking data, or supplement its own tracking data or operations with the received data.

Figure 8:
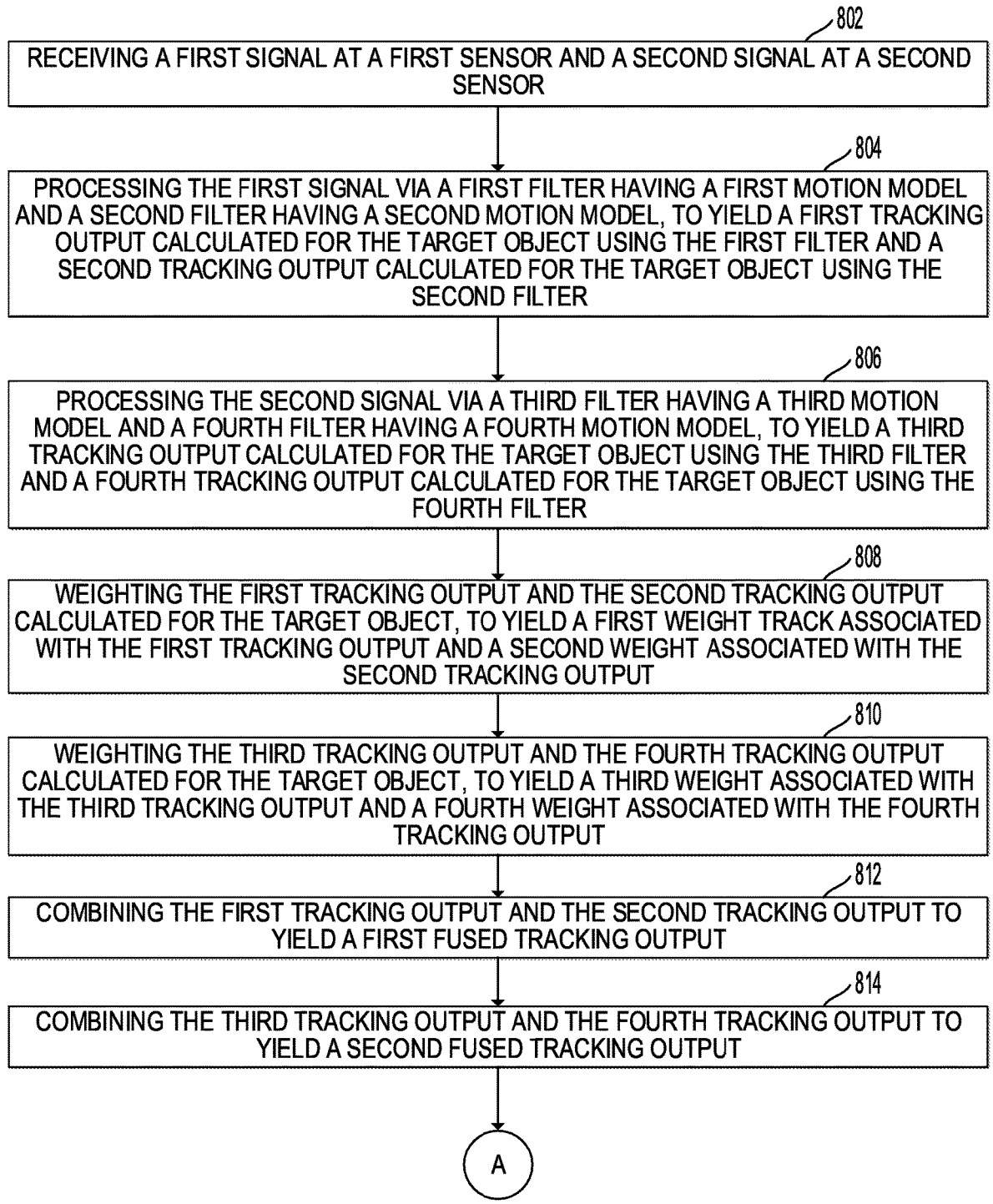
FIG. 8 illustrates an example method for calculating and fusing asynchronous sensor tracks in a track fusion application.
Figure 8:
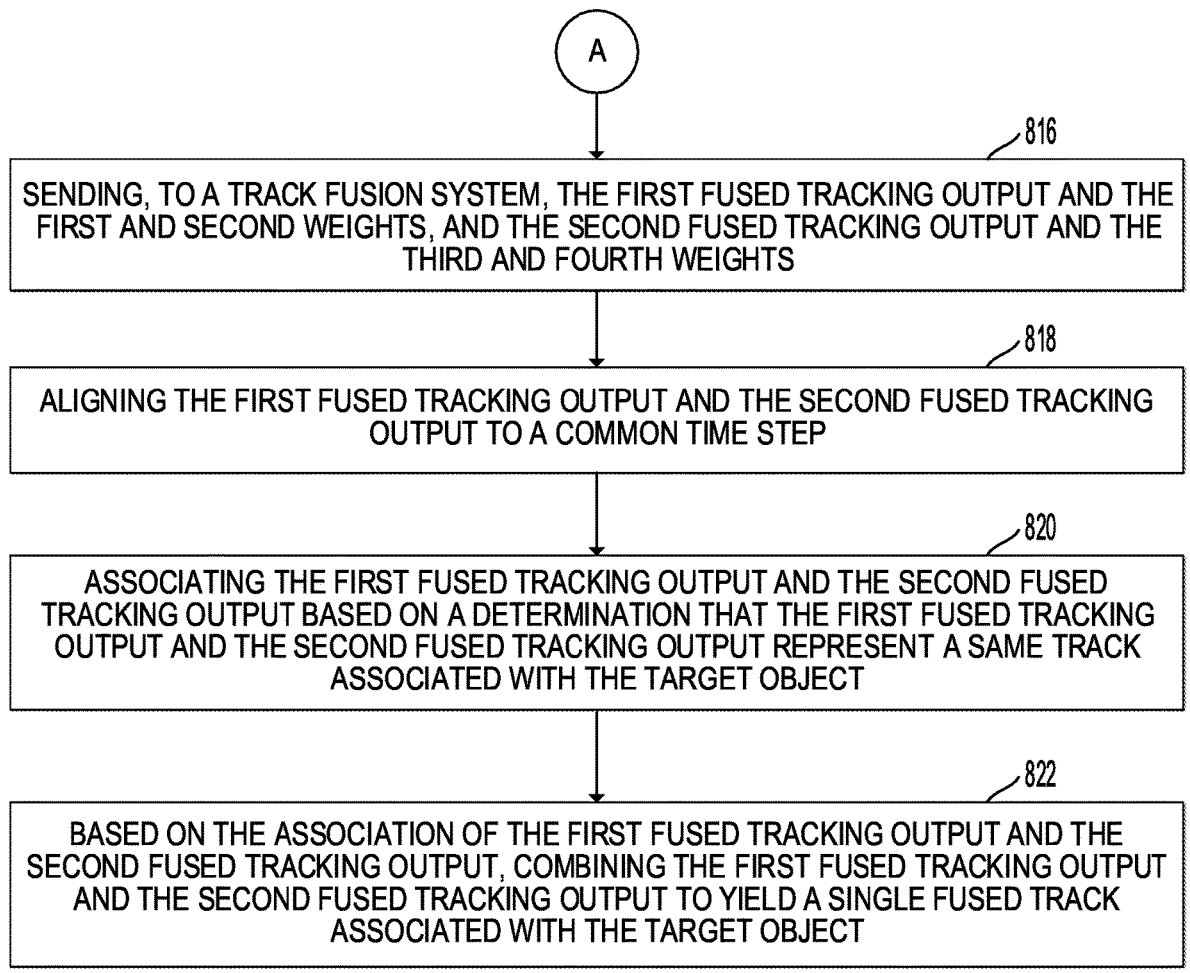
Figure 9:
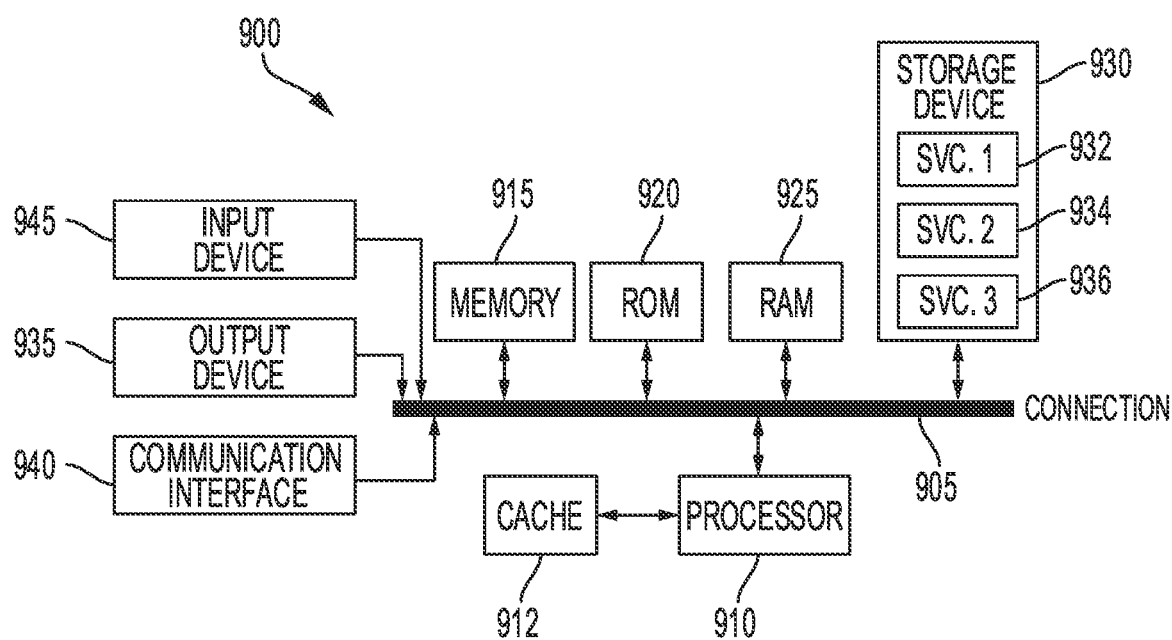
FIG. 9 illustrates an example computer system architecture for a computing device which can be used to implement computing operations, in accordance with various examples.

Having disclosed example system components and concepts, the disclosure now turns to the example method for calculating and fusing asynchronous sensor tracks in a track fusion application, as shown in FIG. 8. The steps outlined herein are examples and can be implemented in any combination thereof, including combinations that exclude, add, or modify certain steps.

At step 802, the method can include receiving a first signal (e.g., sensor data 202) at a first sensor (e.g., 102) and a second signal (e.g., sensor data 202) at a second sensor (e.g., 104). The first and second signal can include measurements and/or sensed data representing a motion (e.g., velocity, acceleration, trajectory, altitude, etc.) of a target object (e.g., 130) and/or a position (e.g., airspace location, angle, etc.) of the target object. For example, the first and second signal can include radar returns, image data capturing one or more aspects (e.g., location, angle, direction, size, shape, relative distance, etc.) of the target object, sound measurements capturing a sound associated with the target object and/or its environment, ADS-B data, rangefinder measurements, etc.

In some cases, the first signal and the second signal can include respective sensor data (e.g., 202) measuring one or more aspects of the motion of the target object (e.g., 130) and/or a position of the target object at one or more times. The one or more aspects of the motion and/or position of the target object can include, for example, a velocity of the target object, an acceleration of the target object, an angle of the target object, a location of the target object in three-dimensional space, a trajectory of the target object, etc.

Moreover, in some cases, the first sensor and the second sensor can be different types of sensors. For example, the first sensor can be a radar sensor and the second sensor can be an optical sensor, or vice versa. In other cases, the first and second sensors may be the same type of sensor, such as a radar sensor, an optical sensor (e.g., a camera), a sound sensor (e.g., a microphone), an RF sensor, an ADS-B sensor, a rangefinder, etc.

At step 804, the method can include processing the first signal via a first filter (e.g., one of the filters 116A, 116B, ..., 116N) having a first motion model and a second filter (e.g., one of the filters 116A, 116B, ..., 116N) having a second motion model, to yield a first tracking output calculated for the target object (e.g., 130) using the first filter and a second tracking output calculated for the target object using the second filter. In some cases, the first filter and the second filter can be part of an IMMF (e.g., 114) containing a plurality of filters. Moreover, in some cases, the first motion model and the second motion model can be associated with different target dynamics. For example, the first motion model can be a constant or near-constant velocity model and the second motion model can be a constant or near-constant acceleration model.

At step 806, the method can include processing the second signal via a third filter (e.g., one of the filters 116A, 116B, ..., 116N) having a third motion model and a fourth filter (e.g., one of the filters 116A, 116B, ..., 116N) having a fourth motion model, to yield a third tracking output calculated for the target object (e.g., 130) using the third filter and a fourth tracking output calculated for the target object using the fourth filter. In some cases, the third filter and the fourth filter can be part of an IMMF (e.g., 114) containing a plurality of filters.

Moreover, in some cases, the third motion model and the fourth motion model can be associated with different target dynamics. For example, the third motion model can be a constant or near-constant velocity model and the second motion model can be a constant or near-constant acceleration model. As another example, the third motion model can be a dynamic motion model and the second motion model can be a random velocity or acceleration model.

In some examples, when calculating tracking outputs, the filters (e.g., first filter, second filter, third filter, fourth filter, etc.) can propagate their respective state and error covariance variables to a future time so that the variables calculated by filters in an IMMF are time aligned. Further, when calculating tracking outputs, in some cases, the filters (e.g., first filter, second filter, third filter, fourth filter, etc.) can use sensor data to estimate a respective likelihood that the tracking outputs calculated are correct (e.g., accurately represent the motion of the target object). This information can be used to calculate weights for the tracking outputs. The weights calculated for filters within an IMMF can be relative to each other and together can sum to 1.

At step 808, the method can include weighting the first tracking output calculated for the target object (e.g., 130) and the second tracking output calculated for the target object (e.g., 130) to yield a first weight associated with the first tracking output and a second weight associated with the second tracking output. The first and second tracking outputs can be weighed according to how well each of the first motion model (and/or the first tracking output) and the second motion model (and/or the second tracking output) represents the motion of the target object. Moreover, the first and second weights can be relative to each other based on their respective accuracies.

At step 810, the method can include weighting the third tracking output calculated for the target object (e.g., 130) and the fourth tracking output calculated for the target object (e.g., 130) to yield a third weight associated with the third tracking output and a fourth weight associated with the fourth tracking output. The third and fourth tracking outputs can be weighed according to how well each of the third motion model (and/or the third tracking output) and the fourth motion model (and/or the fourth tracking output) represents the motion of the target object. The third and fourth weights can similarly be relative to each other based on their respective accuracies.

In some examples, each respective weight from the weights calculated for the filters in an IMMF has a respective value between 0 and 1. Moreover, the sum of all weights calculated for the filters in an IMMF can equal 1.

At step 812, the method can include combining the first tracking output and the second tracking output to yield a first fused tracking output. Similarly, at step 814 the method can include combining the third tracking output and the fourth tracking output to yield a second fused tracking output. In some aspects, prior to combining the first tracking output and the second tracking output, the method can include aligning the first tracking output and the second tracking output in time, as previously explained.

For example, the method can include propagating or projecting the first tracking output and the second tracking output to a future time, which can be, for example, a common time step. Similarly, prior to combining the third and fourth tracking outputs, the method can include aligning the third tracking output and the fourth tracking output in time. For example, the method can include propagating or projecting the third tracking output and the fourth tracking output to a future time.

At step 816, the method can include sending, to a track fusion system (e.g., 302), the first fused tracking output and the first and second weights, and the second fused tracking output and the third and fourth weights. For example, the first sensor can send the first fused tracking output and the first and second weights to the track fusion system, and the second sensor can send the second fused tracking output and the third and fourth weights to the track fusion system. The first and second sensors can send this data to the track fusion system for track association (e.g., 308) and track fusion (e.g., 310).

At step 818, the method can align (e.g., via the track fusion system) the first fused tracking output and the second fused tracking output to a common time step. The method can align the first and second fused tracking outputs to the common time step by propagating or projecting the first and second tracking outputs to the common time step. Moreover, the method can propagate or project the first and second tracking outputs to the common time step using the weights (e.g., the first, second, third, and fourth weights) included in the first and second fused tracking outputs and filters (and/or motion models) included in IMMFs on the track fusion system.

For example, the track fusion system can use the first and second weights associated with the first fused tracking output to determine which filters and/or motion models to apply (or to what degree such filters and/or motion models should be applied) when propagating the first fused tracking output to the common time step. The first and second weights can correspond to specific filters and/or motion models included in an IMMF on the track fusion system, which allows the track fusion system to determine which (and/or how) filters or motion models to use to propagate the first fused tracking output. Such filters and/or motion models in the IMMF on the track fusion system can match, mirror, and/or correspond to the filters and/or motion models in the first sensor used to calculate the first and second tracking outputs associated with the first and second weights.

Similarly, the track fusion system can use the third and fourth weights associated with the second fused tracking output to determine which filters and/or motion models to apply (or to what degree such filters and/or motion models should be applied) when propagating the second fused tracking output to the common time step. The third and fourth weights can correspond to specific filters and/or motion models included in an IMMF on the track fusion system, which allows the track fusion system to determine which (and/or how) filters or motion models to use to propagate the second fused tracking output. Such filters and/or motion models in the IIVIMF on the track fusion system can match, mirror, and/or correspond to the filters and/or motion models in the first sensor used to calculate the third and fourth tracking outputs associated with the third and fourth weights.

Time aligning the first and second fused tracking outputs can help determine with greater accuracy if the first and second fused tracking outputs represent or correspond to the same track, as tracks that are misaligned in time can be harder to compare or identify as representing the same track and may lead to errors or inaccuracies when comparing the tracks and/or determining whether the tracks represent a same track.

Once the first and second fused tracking outputs have been time aligned, at step 820, the method can include associating (e.g., 308) the first fused tracking output and the second fused tracking output (which have been time aligned) based on a determination that the first fused tracking output and the second fused tracking output represent or correspond to a same track associated with the target object. For example, the track fusion system (e.g., 302) can compare the time aligned first and second fused tracking outputs to determine whether the first fused tracking output and the second fused tracking output represent the same target object (e.g., 130). To illustrate, if the first fused tracking output represents a track 1 (e.g., 408) and the second fused tracking output represents the track 1 (e.g., 410), the first and second fused tracking outputs (e.g., tracks 408 and 410) can be compared and associated (e.g., track 1 association 406) to indicate they represent the same target object.

At step 822, the method can include, based on the association (e.g., 308) of the first fused tracking output and the second fused tracking output (and/or the determination that they represent the same track), combining the first fused tracking output and the second fused tracking output to yield a single fused track (e.g., fused track 326, fused track 510, fused track 512, or fused track 514) associated with the target object (e.g., 130). The single fused track can represent a motion of the target object, a location of the target object, a trajectory or path of the target object, etc. The single fused track can thus be used to track the target object. In some cases, the single fused track can be used with other fused tracks calculated for the target object to track the target object and/or can be communicated to one or more devices (e.g., sensor devices 102-112, one or more track fusion systems 302, etc.), which can store the single fused track and/or use the single fused track in tracking the target object. In other words, the system can use the fused tracking output, received at the fusion tracking system, to initialize the filters used to produce the first tracking output and the second tracking output. The track fusion system can then use the respective model weights to perform an IMM propagation to a future time. The fact that the system uses the model weights to initialize the same filters (in one aspect) that are running on the sensor can allow the system to perform the propagation to a common time step.

The combining at step 822 can involve performing a track fusion (e.g., 310) of the associated tracks (e.g., the first and second fused tracking outputs) to generate a single fused track. For example, in the previous example where the first fused tracking output represents track 1 (e.g., 408) and the second fused tracking output also represents track 1 (e.g., 410), the first and second fused tracking outputs (e.g., 408 and 410) can be fused into a single fused track 1 (e.g., 510).

In some examples, the first tracking output, the second tracking output, the third tracking output, the fourth tracking output, the first fused tracking output, the second fused tracking output, and/or the single fused track can include respective state and error covariance variables calculated for the target object (e.g., 130) based on the first, second, third, and/or fourth filters. The respective state and error covariance variables can include, for example, respective velocity variables (e.g., velocity up, velocity down, velocity east, velocity west, etc.), respective position variables (e.g., position up, position down, position east, position west, etc.), respective motion variables, respective angle variables, and/or any other location and motion parameters.

In some aspects, the method can include dynamically adjusting one or more weights defined for weighting and/or time aligning the first tracking output, the second tracking output, the third tracking output, the fourth tracking output, the first fused tracking output, and/or the second fused tracking output based on how accurately they respectively reflect the motion and/or position of the target object (e.g., 130). For example, if a specific tracking output is determined to poorly reflect the motion of the target object, the weight associated with that tracking output can be decreased thus changing the bias or relevance of that tracking output. Similarly, if a specific tracking output is determined to accurately reflect the motion of the target object, the weight associated with that tracking output can be increased to change the bias or relevance of that tracking output.

The disclosure now turns to FIG. 9, which illustrates an example computing system architecture 900 including various hardware components which can be implemented by the sensor devices 102-112, the track fusion system 302, and/or any other computing device to track objects, communicate tracking and/or sensor data, and/or perform various computing operations.

In this example, FIG. 9 illustrates the computing system architecture 900 includes components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

What is claimed is:

1. A method comprising:
   generating, via a first sensor, a first group of output tracks associated with a motion of a target object;
   generating, via a second sensor, a second group of output tracks associated with the motion of the target object;
   associating, via a track association module, a first group of similar tracks from the first group of output tracks and the second group of output tracks to yield a first set of associated output tracks;
   associating, via the track association module, a second group of similar tracks from the first group of output tracks and the second group of output tracks to yield a second set of associated output tracks;
   fusing, via a track fusion module, the first group of similar tracks into a first fused track; and
   fusing, via the track fusion module, the second group of similar tracks into a second fused track.

2. The method of claim 1, wherein:
   the first sensor comprises a first filter having a first motion model and a second filter having a second motion model, to yield a first tracking output calculated for the target object using the first filter and a second tracking output calculated for the target object using the second filter, the first tracking output and the second tracking output being part of the first group of output tracks; and
   the second sensor comprises a third filter having a third motion model and a fourth filter having a fourth motion model, to yield a third tracking output calculated for the target object using the third filter and a fourth tracking output calculated for the target object using the fourth filter, the third tracking output and the fourth tracking output being part of the second group of output tracks.

3. The method of claim 2, further comprising:
   weighting the first group of output tracks and the second group of output tracks, to yield a set of weights comprising a first weight associated with the first group of output tracks and a second weight associated with the second group of output tracks; and
   initializing at least one filter using the fused tracking output and using at least one of the first fused track, the second fused track and the set of weights to perform an interactive multiple model propagation to a future time.

4. The method of claim 1, further comprising:
   aligning the first group of output tracks and the second group of output tracks in time to yield a first time aligned track and a second time aligned track, wherein the first group of output tracks and the second group of output tracks are aligned by projecting the first group of output tracks and the second group of output tracks to a common time step based on a first weight associated with the first group of output tracks and a second weight associated with the second group of output tracks; and
   associating the first time aligned track with the second time aligned track based on a determination that the first time aligned track and the second time aligned track represent a same target object.

5. The method of claim 4, further comprising:
   after associating the first time aligned track and the second time aligned track, combining the first time aligned track and the second time aligned track to yield a single fused track associated with the target object.

6. The method of claim 1, wherein a sum of all weights associated with the first fused track and the second fused track is equal to 1.

7. The method of claim 1, wherein the first group of output tracks and the second group of output tracks comprise respective state and error covariance variables.

8. The method of claim 7, wherein the respective state and error covariance variables comprise at least one of respective velocity variables, respective position variables, respective motion variables, and respective angle variables.

9. The method of claim 1, wherein the first sensor is of a first type and the second sensor is of a second type.

10. The method of claim 9, wherein the first type and the second type each relate to one or more of a motion sensor, a radio frequency sensor, a sound sensor, an optical sensor, a rangefinder, a radar sensor and an automatic dependent surveillance-broadcast sensor.

11. A system comprising:
    one or more processors;
    a first sensor;
    a second sensor;
    a track association module;
    a track fusion module; and
    at least one computer-readable storage medium having instructions stored which, when executed by the one or more processors, cause the one or more processors to perform operations comprising:
      generating, via the first sensor, a first group of output tracks associated with a motion of a target object;
      generating, via the second sensor, a second group of output tracks associated with the motion of the target object;
      associating, via the track association module, a first group of similar tracks from the first group of output tracks and the second group of output tracks to yield a first set of associated output tracks;
      associating, via the track association module, a second group of similar tracks from the first group of output tracks and the second group of output tracks to yield a second set of associated output tracks;
      fusing, via the track fusion module, the first group of similar tracks into a first fused track; and
      fusing, via the track fusion module, the second group of similar tracks into a second fused track.

12. The system of claim 11, wherein:
    the first sensor comprises a first filter having a first motion model and a second filter having a second motion model, to yield a first tracking output calculated for the target object using the first filter and a second tracking output calculated for the target object using the second filter, the first tracking output and the second tracking output being part of the first group of output tracks; and
    the second sensor comprises a third filter having a third motion model and a fourth filter having a fourth motion model, to yield a third tracking output calculated for the target object using the third filter and a fourth tracking output calculated for the target object using the fourth filter, the third tracking output and the fourth tracking output being part of the second group of output tracks.

13. The system of claim 12, further comprising:
weighting the first group of output tracks and the second group of output tracks, to yield a set of weights comprising a first weight associated with the first group of output tracks and a second weight associated with the second group of output tracks; and
initializing at least one filter using the fused tracking output and using at least one of the first fused track, the second fused track and the set of weights to perform an interactive multiple model propagation to a future time.

14. The system of claim 11, further comprising:
aligning the first group of output tracks and the second group of output tracks in time to yield a first time aligned track and a second time aligned track, wherein the first group of output tracks and the second group of output tracks are aligned by projecting the first group of output tracks and the second group of output tracks to a common time step based on a first weight associated with the first group of output tracks and a second weight associated with the second group of output tracks; and
associating the first time aligned track with the second time aligned track based on a determination that the first time aligned track and the second time aligned track represent a same target object.

15. The system of claim 14, further comprising:
after associating the first time aligned track and the second time aligned track, combining the first time aligned track and the second time aligned track to yield a single fused track associated with the target object.

16. The system of claim 11, wherein a sum of all weights associated with the first fused track and the second fused track is equal to 1.

17. The system of claim 11, wherein the first group of output tracks and the second group of output tracks comprise respective state and error covariance variables.

18. The system of claim 17, wherein the respective state and error covariance variables comprise at least one of respective velocity variables, respective position variables, respective motion variables, and respective angle variables.

19. The system of claim 11, wherein the first sensor is of a first type and the second sensor is of a second type.

20. The system of claim 19, wherein the first type and the second type each relate to one or more of a motion sensor, a radio frequency sensor, a sound sensor, an optical sensor, a rangefinder, a radar sensor and an automatic dependent surveillance-broadcast sensor.

\* \* \* \* \*